Figure 1B:
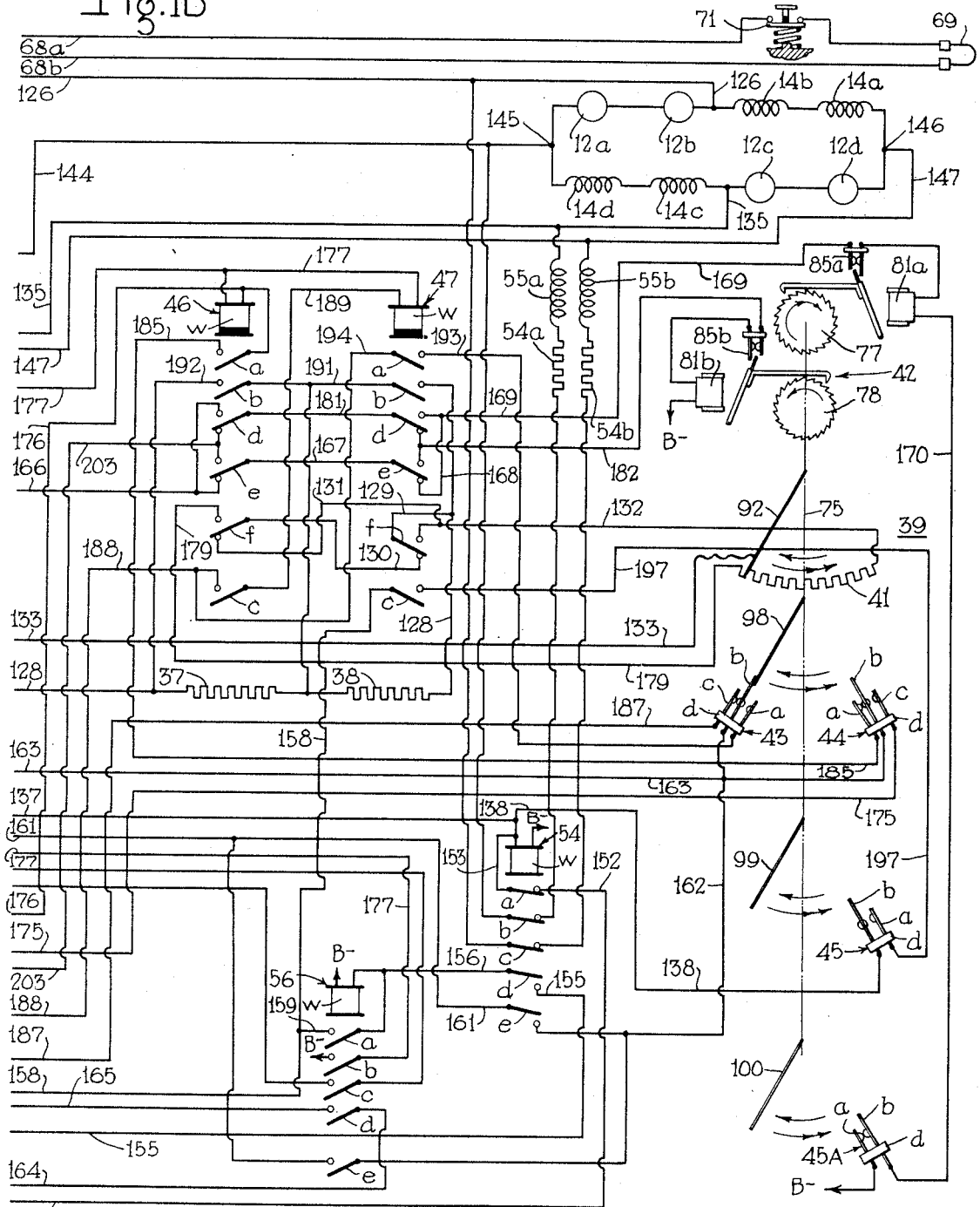

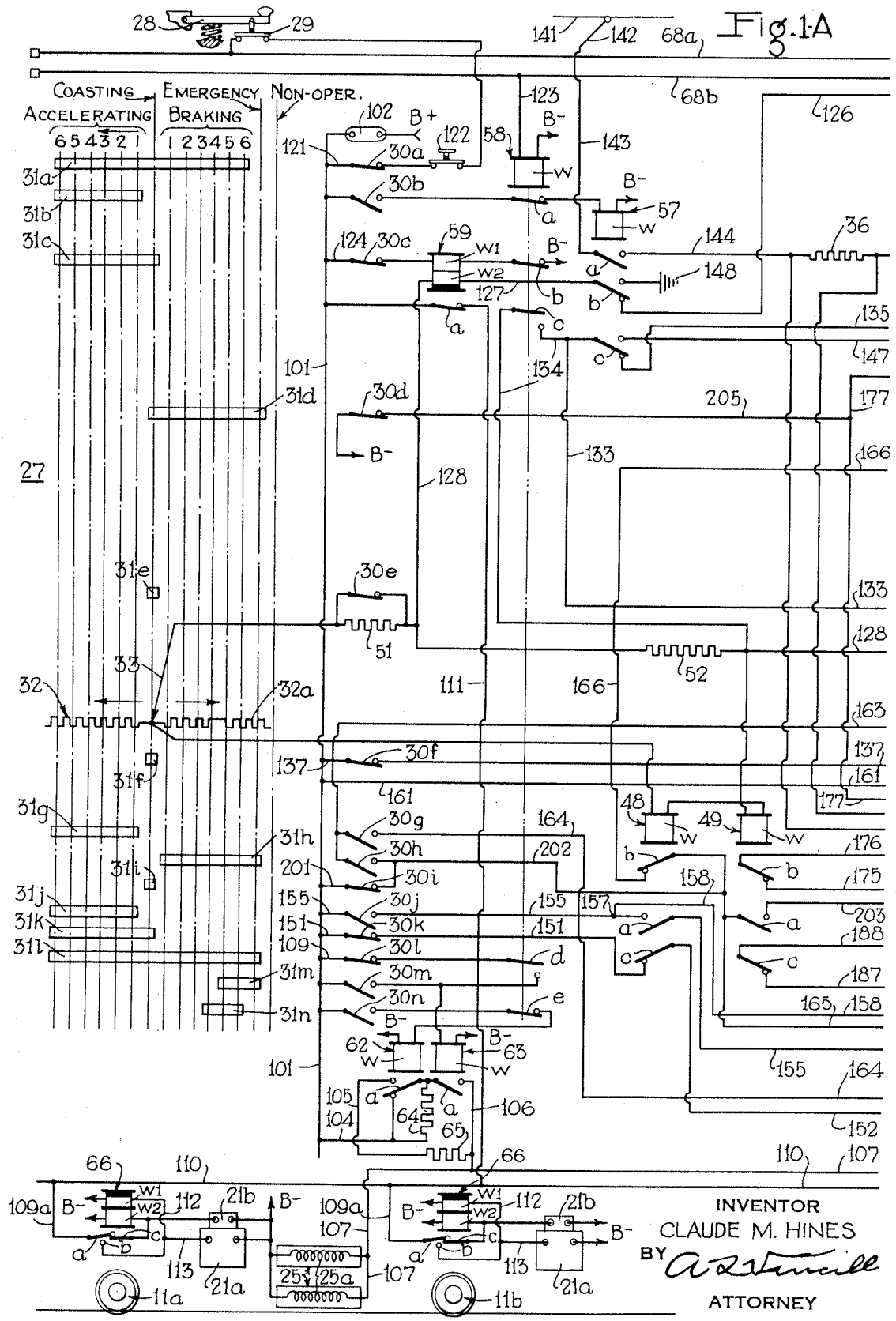

Dec. 26, 1944.   C. M. HINES   2,366,029
PROPULSION AND BRAKING CONTROL SYSTEM
Filed Dec. 31, 1942    3 Sheets-Sheet 2

INVENTOR
CLAUDE M. HINES
BY
ATTORNEY

Dec. 26, 1944. C. M. HINES 2,366,029
PROPULSION AND BRAKING CONTROL SYSTEM
Filed Dec. 31, 1942 3 Sheets-Sheet 3
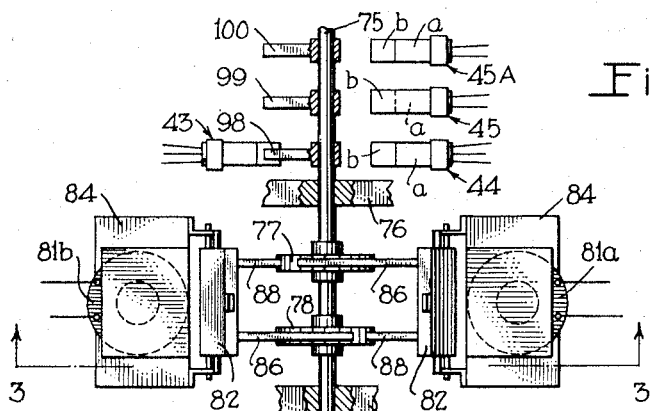
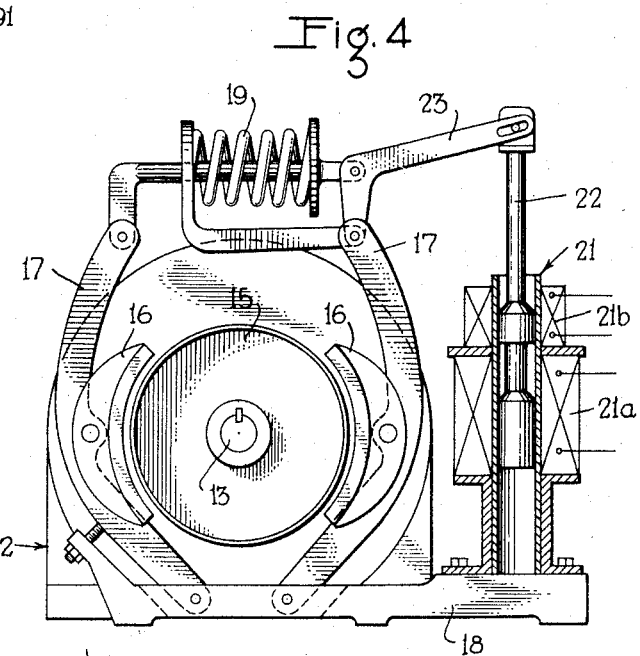
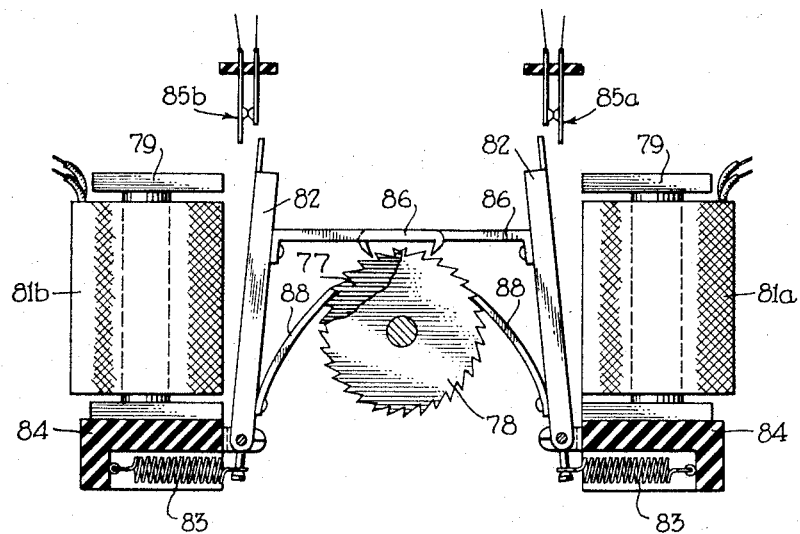
INVENTOR
CLAUDE M. HINES
BY
ATTORNEY Patented Dec. 26, 1944

2,366,029

UNITED STATES PATENT OFFICE 2,366,029

PROPULSION AND BRAKING CONTROL SYSTEM

Claude M. Hines, Pittsburgh, Pa., assignor to The Westinghouse Air Brake Company, Wilmerding, Pa., a corporation of Pennsylvania Application December 31, 1942, Serial No. 470,806

36 Claims. (Cl. 172—179)

This invention relates to propulsion and braking control systems for vehicles, such as railway cars and trains, and has particular relation to electric propulsion and braking systems having a plurality of types of braking devices, for example, a dynamic brake utilizing the propulsion motors of the vehicle, a magnetic track brake, and a friction brake of the spring-applied electrically-released type.

Street railway cars or cars in subway service are commonly provided with braking systems of the multiple brake type, known as the PCC type, in which the propulsion motors function as dynamic brakes to provide a certain maximum degree of braking, in which magnetic track brakes supplement the degree of braking and in which friction brakes associated with the car wheels are employed for providing additional braking and for parking. The parking brakes commonly employed are of the fluid pressure controlled type necessitating the usual brake cylinders, piping, and fluid compressors for charging reservoirs.

It is an object of my present invention to provide a novel braking system for traction railway vehicles of the multiple brake type, characterized in that all of the various brake devices employed, including the parking brakes, are of the electrically controlled type so as to obviate the necessity for fluid compressors, piping, and brake cylinders.

It is another object of my invention to provide a propulsion and braking system wherein noval control apparatus is provided for controlling the propulsion motors both during propulsion and during dynamic braking.

It is another object of my invention to provide novel vehicle propulsion motor control apparatus of the type disclosed in Patent No. 2,120,956 to J. F. Tritle.

The above objects, and other objects of my invention which will be made apparent hereinafter, are attained in an illustrative embodiment of my invention shown in the accompanying drawings, wherein Figures 1A and 1B, taken together, constitute a simplified diagrammatic view of an all electric propulsion and multiple brake control system, Figure 2 is a diagrammatic plan view of the reversible stepping relay employed in the motor control system shown in Figs. 1A and 1B, Figure 3 is a view, taken on the line 3—3 of Figure 2, showing in further detail the structure of the stepping relay of Fig. 2, and Figure 4 is a view, partly in section, showing details of the spring-applied electrically released friction brakes employed in connection with the propulsion motors in the system of Figs. 1A and 1B.

DESCRIPTION

The electric propulsion and braking system shown in Figs. 1A and 1B is illustratively applied to a single car having two wheel trucks, one at each end of the car. The wheel trucks shown are of the four-wheel type having two wheel and axle assemblies, each assembly comprising two wheels fixed at opposite ends of a connecting axle. The respective wheel and axle assemblies are designated 11a, 11b, 11c and 11d in the drawings. Only one wheel of each assembly is visible in the drawings. Each wheel and axle assembly is coupled to the shaft 13 of corresponding propulsion motor 12 (see Fig. 4) through a suitable drive mechanism not shown.

For convenience of identification, the motor for each wheel and axle assembly employs the suffix letter $a$, $b$, $c$, and $d$ of the corresponding wheel and axle assembly to designate the armature winding and the series field winding of the corresponding motor. Thus, in Figure 1B the armature windings of the four motors are designated 12a, 12b, 12c, and 12d respectively and the series field windings are designated 14a, 14b, 14c, and 14d, respectively.

The propulsion motors 12 are arranged to be connected for operation as dynamic brakes by means of control apparatus hereinafter to be described.

Associated with each propulsion motor is a so-called "parking" brake of the spring-applied solenoid-released type, shown in Figure 4 and diagrammatically indicated in Figs. 1A and 1B. Briefly, the spring-applied solenoid-released brake associated with each of the motors comprises a brake drum 15 fixed on an extension of the armature shaft 13 of the motor and two brake shoes 16 located respectively on diametrically opposite sides of the brake drum for engaging the brake drum. The brake shoes 16 are respectively carried by curved levers 17, each of which is pivoted at the lower end thereof on an extension 18 of the frame of the motor and arranged, in familiar manner, to be urged toward each other by a coil spring 19 to effect application of the shoes 16 to the drum. The spring 19 is compressed and the levers 17 moved apart to disengage the shoes from the brake drum by a compound solenoid device 21.

The solenoid device 21 comprises a main or release solenoid 21a and an auxiliary or release-maintaining solenoid 21b, arranged in coaxial relation in a manner to individually exert an upward force on a common plunger 22 which is connected at its upper end through a slot and pin connection to a bell crank lever 23. The bell crank lever 23 is so connected to the levers 17 carrying the brake shoes to effect compression of the spring 19 and separation of the levers 17 when the plunger 22 is raised.

The main solenoid 21a is larger than the auxiliary solenoid 21b and is capable of exerting a greater force than solenoid 21b on the plunger 22 in order to initially overcome the spring 19 to effect the release of the brake shoes 16 from the brake drum 15. The auxiliary solenoid 21b is so designed that it is capable of exerting sufficient force on the plunger 22 to hold the spring 19 in compressed condition to maintain the brake shoes released from the brake drum after the brake shoes have been released by action of the main solenoid 21a.

The solenoids 21a and 21b are controlled in such a manner, hereinafter described in detail, that after the brake shoes have been released by the main solenoid 21a, the auxiliary solenoid 21b is energized to hold the brakes released and the main solenoids 21a is then deenergized. It is thus possible to minimize the amount of electrical current or energy required to maintain the brake shoes in release position since auxiliary solenoids 21b requires less current than solenoid 21a.

Each of the wheel trucks also carries two magnetic track brake devices 25, located respectively on opposite sides of the truck, for engagement with opposite rails of the tracks. The track brake devices 25 are normally suspended above and out of contact with the track rails by helical springs and are actuated by magnetic attraction into engagement with the track rails in response to energization of the magnetic winding 25a thereof.

The magnetic track brake devices 25 and the propulsion motors 12 are controlled by means of a combination propulsion and braking controller 27, diagrammatically indicated in Figure 1A. Controller 27 is of the cam operated contactor type having a rotary shaft to which an operating handle 28 is removably attached. Handle 28 is arranged in familiar manner, as diagrammatically shown, to close and open a deadman switch 29 in response to the application and release respectively of downward pressure on the handle.

As diagrammatically shown, the controller 27 comprises a plurality of switches respectively designated 30a, 30b, 30c, 30d, 30e, 30f, 30g, 30h, 30i, 30j, 30k, 30l, 30m and 30n. The cams for operating the respective switches are diagrammatically indicated in a horizontal line opposite the corresponding switch and are respectively designated 31a to 31n.

As diagrammatically shown, the controller handle 28 has a normal position, designated "Coasting" position, and is shiftable to opposite sides of the "Coasting" position into a braking zone and an accelerating zone respectively.

As the controller handle 28 is shifted away from the coasting position into the braking zone it passes successively through six service braking positions designated 1 to 6 respectively, then into a position designated "Emergency" position, and finally into a "Non-operative" position. The controller handle 28 is so arranged that it may be removed only in the non-operative position thereof. Various expedients are known for preventing the removal of the controller handle except in a predetermined operating position thereof and accordingly such structure is not illustrated.

When the controller handle 28 is shifted into the accelerating zone, it passes successively through six positions, designated respectively 1 to 6.

As will be explained more fully hereinafter, the degree of braking effected increases progressively as the degree of displacement of the controller handle 28 out of Coasting position into the braking zone increases. Similarly, the rate of acceleration increases progressively as the displacement of the controller handle 28 out of Coasting position into the accelerating zone increases.

While I have shown only six service braking positions and six accelerating positions, any desired number of positions may be employed.

The controller switches 30a to 30n are opened and closed in certain predetermined positions of the controller shaft and handle 28. It will be understood that a controller switch is closed only in a position covered by the corresponding cam 30a to 30n.

Associated with and operated by rotation of the operating shaft of the controller is a rheostat 32. The rheostat 32 preferably comprises a resistor 32a having progressively spaced tap connections which are connected to successive segments of a non-rotative commutator (not shown). Associated with the commutator is a brush or movable contact arm, indicated diagrammatically at 33. The brush device 33 is fixed on the operating shaft of the controller 27 and is rotated in correspondence with the rotary movement thereof. The arrangement of the resistance 32a of the rheostat 32 is such that the brush device 33 is displaceable in opposite directions from a neutral position corresponding to the Coasting position of the controller handle 28 to progressively increase the resistance between the point of contact of the brush with the commutator and the neutral position thereof in the manner more fully explained hereinafter.

The controller 27 functions together with control apparatus hereinafter to be described and its operation will be fully explained hereafter in connection with an assumed operation.

The control apparatus associated with the controller 27 comprises a plurality of motor control resistors 36, 37, and 38; a rheostat 39 including a resistor 41, operating mechanism in the form of a reversible stepping relay 42, and limit switches 43, 44, 45, and 45a; two transfer or control relays 46 and 47, respectively, for controlling the direction of operation of the stepping relay 42 and resistors 37 and 38; a pair of current limit or current regulating relays 48 and 49 for controlling the operation of the stepping relay 42; two resistors 51 and 52 included in the motor control circuit and arranged in a manner to control the operation of the current limit relays 48 and 49; motor field shunting apparatus including a shunting relay 54, two resistors 54a and 54b, respectively, and two reactors 55a and 55b; a cushioning relay 56; a brake control relay 57; an emergency relay 58; and a lock-out relay 59.

Associated with the controller 27 for the purpose of controlling the magnet windings 25a of the magnetic track brake devices are two relays 62 and 63 and two resistors 64 and 65.

An additional relay 66 is also provided for each wheel and axle assembly for the purpose of controlling the main and auxiliary solenoids 21a and 21b of the spring-applied brake device associated therewith.

The control apparatus further comprises an emergency wire comprising two wires 68a and 68b extending from end to end of the car and connected to each other at one end through a loop connector 69. When the car is employed in a train, the loop conductor is only on the end car, the sections of the wires 68a and 68b on the car being suitably connected between cars. Interposed in one of the wires, such as the wire 68a is a conductor's switch 71 which is normally closed and opened only in response to the application of pressure thereto.

The deadman switch 29 associated with the controller 27 and the conductor's switch 71 are employed in a manner more fully described hereinafter to control the energization and deenergization of the emergency wire 68b which in turn controls the emergency relay 58.

Considering the parts of the control apparatus in greater detail, the stepping relay 42 (see Figs. 2 and 3) comprises a rotary armature or operating shaft 75 suitably journaled in spaced supports 76. Fixed on the shaft 75 in spaced coaxial relation are two ratchet wheels 77 and 78 respectively.

Associated with the ratchet wheel 77 of the stepping relay is an operating device comprising a magnetic core 79, an electro-magnetic winding 81a on the core, and a pivoted armature 82. Associated with the ratchet wheel 78 is a similar operating device comprising a magnetic core 79, an electromagnetic winding 81b on the core, and a pivoted armature 82. Each armature 82 is normally biased away from its core 79 by a spring 83, attached at one end to the armature and at the other end to a fixed support or base 84, and is attracted to the core in response to energization of the corresponding winding 81a or 81b.

Connected in series relation with the windings 81a and 81b and associated with the corresponding armature 82 is a switch 85a and 85b, respectively, of the telephone type having two contact fingers normally biased into contact with each other. One of the contact fingers of each switch is bent by the armature when attracted to the core 79, to cause separation of the contact fingers of the switch.

The switches 85a and 85b operate in well known manner to control the corresponding winding 81a and 81b so as to cause automatic and repeated deenergization and energization of the winding and the consequent repeated movement of the corresponding armature 82 toward and away from core 79.

Each of the armatures 82 has a hook shaped pawl 86 attached thereto which extends into cooperative relation with the corresponding ratchet wheel 77 or 78 and which is effective to advance the ratchet wheel one or more tooth distances each time the movement of the armature toward the core 79 is effected in response to energization to the corresponding winding 81a or 81b.

The ratchet wheels 77 and 78 have their teeth inclined respectively in opposite directions so that the alternate energization and deenergization of the magnet winding 81a causes rotational movement of the operating shaft 75 in one direction and the alternate energization and deenergization of the magnet winding 81b causes rotational movement of the shaft 75 in the opposite direction.

In order to hold the ratchet wheels 77 and 78 against movement as the pawls 86 are restored backwardly in response to the deenergization of the corresponding winding 81a or 81b, each of the armatures 82 has a flexible leaf spring 88 secured thereto which frictionally engage the teeth of the ratchet wheel associated with the other operating device.

As thus far described the reversible stepping relay is generally similar to the relay device disclosed in Patent 1,932,020 issued to B. Lazich and is in itself not my invention.

The rheostat 39 comprises a brush holder 91 fixed on the shaft 75 carrying in insulated relation therein a contact or brush 92 for engaging a commutator 93 that is non-rotatively supported in coaxial relation to the shaft 75, as by a support 94. The commutator 93 has a plurality of commutator segments to each of which a separate wire, indicated by the group of wires 95, is connected. The group of wires 95 are contained in a cable 96 that extends through a tubular shaft 97 carrying the commutator 93 and secured in the support 94. The wires 95 are connected to progressively spaced points of the resistor 41. It will thus be apparent that as the brush 92 rotates with respect to the commutator 93 it progressively increases or decreases the amount of the resistor 41 in a circuit including the resistor 41.

A plurality of limit switches 43, 44, 45 and 45A are associated with the shaft 75 and are operated by contact arms 98, 99, and 100 fixed on the shaft.

The limit switches 43 and 44 are identical, each comprising three flexible contact fingers $a$, $b$, $c$, supported in a row in an insulating member $d$, in a given plane. The contact finger $b$ has an inherent bias in the direction of the contact finger $a$ and normally engages the contact finger $a$. The contact arm 98 engages an extension of the contact finger $b$ when the shaft 75 reaches on extremity of rotary movement thereof and bends it out of contact with the finger $a$ and into engagement with the contact finger $c$. In a similar manner, when the rotary shaft 75 reaches the opposite extremity of rotary movement thereof, the contact arm 98 engages the contact finger $b$ of the limit switch 44 and bends it out of contact with the contact finger $a$ and into engagement with contact finger $c$.

Limit switch 45 has two flexible contact fingers $a$ and $b$ supported in an insulating base $d$. The contact finger $b$ is normally biased to a position out of engagement with the contact finger $a$ and is bent into contact with the contact finger $a$ when the contact arm 99 engages the contact finger $b$ at the time the rotary shaft 75 reaches the same extremity of rotary movement thereof at which it operates the limit switch 44.

Limit switch 45A has two contact fingers $a$ and $b$ supported in an insulating base $d$ and normally biased into engagement with each other. Contact arm 100 is arranged to engage an extension of contact finger $b$ to separate it from finger $a$ where the brush 92 reaches the same extremity of movement at which limit switches 44 and 45 are operated by their respective arms 98 and 99.

Energization of one or the other of the magnet windings 81a or 81b of the operating mechanism of the rheostat 39 is selectively effected under the joint control of the two relays 46 and 47. The relays 46 and 47 are standard relays having a slow drop-out characteristic, the reason for the slow drop-out characteristic being made apparent hereinafter. The relays 46 and 47 comprise the usual magnetic core having a magnet winding $w$ associated therewith and an armature which is actuated to a picked-up position from a normally dropped-out position to which it is biased by a spring means or by gravity, in response to the energization of the winding $w$. The two relays 46 and 47 are identical in construction and each has a plurality of contact member or switches which are operated by the armature of the relay. Thus, each of the relays 46 and 47 has three front contacts $a$, $b$, and $c$ which are actuated from an open to a closed position in response to the pick-up of the armature of the relays. Each of the relays 46 and 47 also has three transfer contacts designated $d$, $e$, and $f$. The transfer contacts $d$, $e$, and $f$ occupy alternatively one or the other of two circuit-closing positions depending upon whether the armature of the relay is in its dropped-out or its picked-up position.

Each of the current limit relays 48 and 49 comprises the usual magnetic core structure having a winding $w$ associated therewith and an armature for actuating a plurality of contacts including one front contact $a$ and two back contacts $b$ and $c$ respectively.

The windings $w$ of the two relays 48 and 49 are not identical, the winding of the relay 48 being designed to cause pick-up of the contacts of relay 48 in response to energization by a current lower than that required to cause pick-up of the contacts of the relay 49.

As will be explained more fully hereinafter, the windings $w$ of the relays 48 and 49, the resistor 32a of the rheostat 32 associated with the controller 27 and resistor 51 are connected in series relation across the resistor 52, which is included in the motoring or dynamic braking circuit of the motors. The relays 48 and 49 are thus responsive to the motoring and dynamic braking current.

The field shunting relay 54 is a standard relay of the neutral type having the usual magnetic core with which is associated a magnet winding $w$ and an armature for actuating a plurality of contacts $a$, $b$, $c$, $d$, and $e$. The contacts $a$, $b$, and $c$ of the relay 54 are front contacts, that is, they are closed only when the armature of the relay is picked-up. The contacts $d$ and $e$ of the relay 54 are back contacts, that is, they are closed only when the armature of the relay is in its dropped-out position.

The contacts of the relay 54 are shown in their picked-up position because a circuit hereinafter described, is established to cause pick-up of the relay 54 when the controller handle 28 is in its Coasting position, as it is assumed to be.

The contact $b$ of the relay 54 is effective in its picked-up or closed position to establish a shunt circuit including the series-connected resistor 54a and the reactor 55a around the motor field windings 14c and 14d. The contact $c$ of relay 54 is effective in its picked-up or closed position to establish a shunting circuit including the series-connected resistor 54b and the reactor 55b around the motor field windings 14a and 14b. These shunting circuits are readily apparent in Figure 1B of the drawings and need no further description.

The function of the contacts $a$, $d$, and $e$ of the relay 54 will be made apparent hereinafter.

The cushioning relay 56 is a standard relay of the neutral type having the usual magnetic core, with which a magnet winding $w$ is associated, and an armature normally biased to a dropped-out position by a spring or gravity and actuated to a picked-up position in response to energization of the winding $w$. The relay 56 has five front contacts $a$, $b$, $c$, $d$ and $e$ which are actuated from their dropped-out or open positions to their picked-up or closed positions in response to the pick-up of the armature of the relay.

The contact $c$ of the cushioning relay 56 is effective in its picked-up or closed position to establish a short circuit connection around the resistor 36 which is included in the motoring circuit. The function of the other contacts of the relay 56 will be made apparent hereinafter.

The brake control relay 57 is a standard neutral relay having the usual magnetic core, with which a winding $w$ is associated, and an armature actuated from a dropped-out to a picked-up position in response to energization of the winding $w$, which armature operates a plurality of contacts $a$, $b$, and $c$. The contact $a$ of the relay 57 is a front contact and the contacts $b$ and $c$ are transfer contacts which occupy alternative circuit-closing position in the dropped-out and picked-up positions thereof, respectively.

The relay 57 functions, in a manner hereinafter described, when picked-up to establish a circuit for supplying propulsion current to the motors and when dropped-out for establishing a dynamic braking circuit including the motors.

The emergency relay 58 is of standard neutral type having the usual magnetic core and a magnetic winding $w$ associated therewith, effective when energized to cause pick-up of an armature which actuates a plurality of contacts $a$, $b$, $c$, $d$ and $e$. The contacts $a$, $b$, and $c$ of the relay 58 are front contacts and the contacts $c$ and $d$ of the relay 58 are back contacts.

The lock-out relay 59 comprises the usual magnetic core and two separate windings $w1$ and $w2$, either of which is effective when energized to cause pick-up or to maintain picked-up the armature of the relay, which in turn actuates a single front contact $a$. Relay 59 also has a slow dropout characteristic.

The windings of the various relays thus far described are energized by current supplied from a suitable source of direct-current, such as a storage battery or a direct-current generator. For convenience, the positive terminal of the source of direct-current is indicated by the designation B+ and the negative terminal is indicated by the designation B—.

In Figure 1A, a wire 101, hereinafter referred to as the positive bus wire, is connected through a normally closed manually operated switch 102 to the positive terminal B+ of the source of current and, unless otherwise indicated, circuits will be hereinafter traced beginning with the positive bus wire 101 for simplicity.

The lock-out relay 59 functions in the manner hereinafter to be described to control the relays 66, which in turn control the solenoids 21a and 21b of the spring-app'ied friction brake devices associated with the motors.

The relays 62 and 63 are simple neutral relays, each having an operating winding $w$ and a single contact $a$. The contact $a$ of the relay 62 is a transfer contact while the contact $a$ of the relay 63 is a front contact.

The winding $w$ of the relay 62 is energized under the joint control of contact $e$ of emergency relay 58 and of the switch 30n of the controller 27. As will be seen in Figure 1A, controller switch 30n is closed in the braking positions 4, 5, and 6 of the controller.

The winding $w$ of the relay 63 is energized in response to the closure of the switch 30m of the controller 27, which as seen in Fig. 1A occurs in braking positions 5 and 6 and the Emergency position of the controller. Winding $w$ of relay 63 is also energized under the joint control of the controller switch 30l and contact $d$ of the emergency relay 58 in all positions of controller 27 except the non-operative position.

It will thus be apparent that as the handle 28 of the controller 27 is shifted out of the Coasting position thereof, both relays remain deenergized through the initial three braking positions 1, 2, and 3. Thereafter, as the displacement of the controller handle out of the Coasting position is further increased, the relays 62 and 63 are successively picked-up and then relay 62 is dropped-out.

With the relay 62 picked-up and the relay 63 dropped-out, a circuit is established for energizing the magnet windings 25a of all of the magnetic track brake devices 25, which circuit includes the two resistors 64 and 65 in series relation therein. This circuit extends from the positive bus wire 101 by way of a branch wire 104, resistor 64, contact a of relay 62 in its picked-up position, a wire 105 including the resistor 65, a wire 106 which is connected to a bus wire 107, then in parallel through all of the magnetic windings 25a of the magnetic track brake devices to the negative terminal B— of the source of current.

The magnet windings 25a are thus energized to a minimum degree sufficient to cause frictional engagement of the magnetic track brake devices with the track rails and the production of a corresponding low degree of braking effect.

With both the relays 62 and 63 picked up, a circuit is established for energizing the magnet windings 25a of the magnetic brake devices, which circuit includes only the resistor 64. This circuit extends from the positive bus wire 101 by way of the branch wire 104, resistor 64, contact a of relay 63, wire 106, bus wire 107, then in parallel through the magnet windings 25a, to the negative terminal B— of the source of current. With the resistor 65 thus cut-out of the circuit, the current energizing the magnet winding 25a is correspondingly increased.

With only the relay 63 picked-up a circuit is established for energizing the magnet windings 25a of the magnetic track brake devices from which the two resistors 64 and 65 are cut-out. This circuit extends from the positive bus wire 101 by way of the branch wire 104, contact a of the relay 62, contact a of the relay 63, wire 106 to the bus wire 107, and then in parallel through the track brake magnet windings 25a to the negative terminal B— of the source of current.

As previously indicated, winding w of the relay 63 is also controlled jointly according to the position of the controller handle 28 and the position of the emergency relay 58. Thus, in all positions of the controller 27, except non-operative position, contact d of the emergency relay 58 is effective in its dropped-out position to establish a circuit for energizing the winding w of the relay 63, which circuit extends from the positive bus wire 101, by way of a branch wire 109 including in series relation therein the controller switch 301 and the back contact d of the emergency relay 58, and the winding of the relay, to the negative terminal B— of the source of current. The track brake windings 25a are thus energized to a maximum degree whenever the emergency relay drops-out because relay 62 is restored simultaneously to its dropped-out position, if not already dropped-out, in response to the opening of contact e of emergency relay 58.

Each of the relays 66 is a slow-acting relay comprising a magnetic core having two separate windings w1 and w2 associated therewith, a resilient flexible contact a which is biased normally into contact with a stationary contact b, and an additional contact c effective when actuated to a picked-up position to first engage contact a and then separate it from contact b.

The contact a of each relay 66 is connected by a wire 109a to a bus wire 110, the bus wire 110 being in turn connected, by a wire 111 including in series relation therein the contact of lock-out relay 59 to the positive bus wire 101. With the contact of the lock-out relay in its picked-up or closed position, therefore, the bus wire 110 is connected to the positive bus wire.

The contact b of each of the relays 66 is connected by a wire 112 to one terminal of the winding w1 of the relay 66, the other terminal of which is connected to the negative terminal B— of the source of current. A branch wire 113 of the wire 112 is connected to one terminal of the solenoid winding 21a of the corresponding spring-applied brake device, the other terminal of which is connected to the negative terminal B— of the source of current. The winding w1 of the relay 66 and the solenoid 21a are thus connected in parallel relation.

In a similar manner, the winding w2 of each relay 66 and the solenoid 21b of the corresponding spring-applied brake devices are connected in parallel between the contact c of the relay 66 and the negative terminal B— of the source of current.

When the bus wire 110 is first connected to the positive bus wire 101, a circuit is established for energizing the winding w1 of each relay 66 and the solenoid 21a of the spring-applied brake device corresponding thereto. Due to the slow pick-up characteristic of the relays 66, an interval of time elapses sufficient to insure the energization of the solenoid 21a in a manner to fully compress the coil spring 19 of the spring-applied brake device to fully release the brake shoes 16 from the brake drum 15 before the contact c engages the contact a and disconnects the contact a from the contact b.

At the instant the contact c of each relay 66 first engages the contact a, the two windings w1 and w2 of the relay 66, as well as the two solenoids 21a and 21b of the corresponding spring-applied brake device, are all simultaneously energized. Thereafter, when the contact c of the relay 66 moves the contact a out of engagement with the contact b, the circuit for energizing the winding w1 of the relay 66 and solenoid 21a is interrupted. By reason of the continued energization of the winding w2 of the relay 66 over the self-holding contact c of the relay, the auxiliary solenoid 21b of each spring-applied brake device is accordingly maintained energized so as to maintain the brake shoes 16 in their released position in opposition to the force of the spring 19.

The manner in which the lock-out relay 59 is controlled will be explained in detail hereinafter, but it may be here stated that the arrangement is such that the relay 59 is maintained picked-up following the initiation of a brake application until such time as the degree of dynamic braking effect reduces below a certain low degree as the car approaches a stop. Thus, it will be seen that the spring-applied brake devices are operated to exert a braking effect on the vehicle wheels by reason of the braking effect exerted on the armature shafts of the driving motors only when the car is substantially stopped. The spring-applied brakes thus function principally for the purpose of parking.

OPERATION

(a) Coasting or starting condition

Let it be assumed that the car is at a standstill, or coasting, with the controller handle 28 in its Coasting position and depressed to close the deadman switch 29.

In such case, the winding w of emergency relay 58 is energized over a circuit extending from the positive bus wire 101 by way of a branch wire 121 including the controller switch 30a, manual switch 122 normally closed as shown, and the closed deadman switch 29 to the emergency wire 68a, thence through the wire 68a including the closed conductor's switch 71 to the loop connector 69 at the end of the car to the emergency wire 68b, thence by way of a branch wire 123 including in series relation therein the winding w of emergency relay 58 to the negative terminal B— of the source of current.

In its picked-up position, the contact b of the emergency relay 58 is effective jointly with the controller switch 30c to effect energization of the winding w1 of the lock-out relay 59. This circuit extends from the positive bus wire 101 by way of a branch wire 124 including in series relation therein the controller switch 30c, the winding w1 of the lock-out relay 59, and contact b of the emergency relay 58 to the negative terminal B— of the source of current.

The contact a of the lock-out relay is accordingly actuated to its picked-up or closed position. Accordingly, as previously described, the winding w1 of each of the relays 66 and the auxiliary solenoid 21b of the spring-applied brake devices are energized so that the brake shoes 16 are held released from the brake drum 15 on the motor shaft 13.

At the same time, the magnetic track brake relays 62 and 63 are both dropped-out in the Coasting position of the controller 27 and consequently the magnet windings 25a of the magnetic track brake devices 25 are deenergized.

At the same time also, the brake control relay 57 is in its dropped-out position establishing a dynamic braking circuit. This circuit may be traced from one terminal of the armature winding 12b of the corresponding motor, by way of a wire 126, transfer contact b of the brake control relay 57 in its dropped-out position, a wire 127, winding w2 of the lock-out relay 59, a wire 128 including in series relation therein the three resistors 52, 37, and 38, a branch wire 129, transfer contact f of the relay 47 in its dropped-out position, a wire 130, transfer contact f of the relay 46 in its dropped-out position, a wire 131, a wire 132, resistor 41 of rheostat 39, brush 92 associated with the commutator to which the resistor 41 is connected, a wire 133 including a flexible portion connected to the movable brush 92, a wire 134, transfer contact c of the brake control relay 57 in its dropped-out position, a wire 135 to one terminal of the motor armature winding 12c where the circuit divides into two branches, one branch extending in series relation through the armature windings 12c and 12d and field windings 14a and 14b to the point of starting and the other branch extending in series relation through the motor field windings 14c and 14d, and the motor armature windings 12a and 12b to the point of starting.

Assuming that the car is at a standstill, and that the armatures of the motors are therefore not rotating, no current flows in the dynamic braking circuit. If the car were in motion, there would in any event be a negligible flow of dynamic braking current because of the fact that the motor field windings 14a and 14b are shunted through the contact c of the field shunting relay 54 and the motor field windings 14c and 14d are shunted through the contact b of the field shunting relay 54.

It will be understood that the field shunting relay 54 is picked-up in the Coasting position of the controller 27 by reason of the energization of the winding w of the relay under the control of controller switch 30f which is closed in the Coasting position of the controller. The circuit for energizing the winding of the field shunting relay 54 extends from the positive bus wire 101 by way of a wire 137 including in series relation therein the controller switch 30f, a wire 138, winding w of the relay 54, and thence to the negative terminal B— of the source of current.

It will thus be seen that, with the controller handle 28 in the Coasting position, all of the brakes are released.

(b) Propulsion

Now let it be assumed that the operator desires to start the car from a standstill. To do so, he shifts the controller handle 28 into the accelerating zone an amount corresponding to the desired rate of acceleration, for example, to position 4.

Due to the fact that the switch 30b of the controller is closed in all accelerating positions of the handle 28, a circuit is thus established for energizing the winding w of the brake control relay 57. The contacts of relay 57 are thus actuated to their picked-up positions, wherein the previously traced dynamic braking circuit is interrupted and a motoring circuit for supplying power current to the motors is established. The motoring circuit for supplying power current from an external source to the motors to propel the car may be traced from a trolley wire or third rail 141 connected to the source, (see Fig. 1A) then by way of a trolley pole or collector device 142, a wire 143, front contact a of the relay 57, a wire 144 including in series relation therein the resistor 36 to the point 145, whence the circuit divides into two parallel branches, one branch including the series-connected motor armature windings 12a and 12b and field windings 14b and 14a, and the other branch including the series-connected motor field windings 14d and 14c and armature windings 12c and 12d, the two branch circuits rejoining at the point 146 and continuing by way of the wire 147, transfer contact c of the relay 57 in its picked-up position, wire 134, wire 133, brush 92 of the rheostat 39, the entire resistor 41, wire 132, wire 131, transfer contact f of the relay 46, wire 130, transfer contact f of the relay 47, wire 129, the wire 128 including in series relation the three resistors 38, 37, and 52, winding w2 of the lock-out relay 59, wire 127, transfer contact b of the brake control relay 57 in its picked-up position, and then back to the external source of power through a ground connection at 148.

Current is accordingly supplied from the external source to the motors to propel the car, the rate of acceleration depending upon the degree to which the controller handle is displaced out of the Coasting position into the accelerating zone for reasons which will be subsequently explained. Upon the rotation of the operating shaft of the controller 27 in response to the movement of the controller handle into the accelerating zone, the brush 33 of rheostat 32 is correspondingly rotated to include a portion of the resistor 32a corresponding to the displacement of the controller handle out of Coasting position in the circuit including the series-connected windings w of the current limit relays 48 and 49 connected across the resistor 52 in the motoring circuit. At the same time, the movement of the controller handle 28 out of the Coasting position causes the controller switch 30e to be opened and thereby remove the shunt connection around the resistor 51 which is thus also included in the circuit of the windings of the relays 48 and 49.

When the current in the motoring circuit rises above a certain value corresponding to a certain rate of acceleration of the car motors, the effective potential on the winding w of the current limit relay 48 is effective to cause sufficient current to flow through the winding of the relay to cause pick-up of the contacts thereof.

The actuation of the back contact c of the relay 48 to its picked-up or open position interrupts a holding circuit previously established thereby for maintaining the winding w of the field shunting relay 54 energized, after the controller handle 28 is shifted out of the Coasting position and the previously described energizing circuit, including the controller switch 30f, is correspondingly interrupted. The holding circuit just mentioned extends from the positive bus wire 101 by way of a wire 151, including closed controller switch 30k, contact c of the relay 48, a wire 152, front contact a of the relay 54, a wire 153, wire 138, winding w of the relay 54, and thence to the negative terminal B— of the source of current.

It will thus be seen that when the holding circuit for relay 54 is interrupted at the contact c of the relay 48, relay 54 is restored to its dropped-out position.

In the dropped-out position of the relay 54, the contacts b and c are effective to interrupt the motor field shunting circuits previously established thereby. The field current is thus instantly increased and consequently a substantial increase in the propulsion torque exerted by the motors takes place to effect acceleration of the car.

The restoration of the back contact d of the field shunting relay 54 to its dropped-out or closed position establishes a circuit for energizing the winding w of the cushioning relay 56 and the contacts of the cushioning relay are accordingly actuated to their picked-up positions. The circuit for energizing the winding of the relay 56 extends from the positive bus wire 101 by way of a branch wire 155 including in series relation therein the controller switch 30j and the front contact a of the relay 48, contact d of the relay 54 in its dropped-out or closed position, a wire 156, winding w of the cushioning relay 56, and then to the negative terminal B— of the source of current.

The front contact a of the cushioning relay 56 is a self-holding contact which is effective in its picked-up or closed position to establish a circuit for maintaining the winding w of the relay 56 energized thereafter as long as the controller handle 28 remains in the accelerating zone. The self-holding circuit for the winding of the relay 56 extends from the positive bus wire 101 by way of the wire 155 including the controller switch 30j to a point 157 between the switch 30j and the contact a of the relay 48, thence by way of a wire 158, a branch wire 159 including in series relation therein the contact a of the relay 56 to the wire 156 and thence through the winding w of relay 56 to the negative terminal B— of the source of current.

The contact c of the cushioning relay 56 is effective in its picked-up or closed position to establish a shunt connection around the resistor 36 in the motoring circuit. This causes an increase of the current in the motoring circuit, and a corresponding increase in the accelerating torque produced by the motors.

Contact e of relay 56 is effective in its picked-up or closed position to establish a shunt circuit around contact e of relay 54 for a reason hereinafter made apparent.

No immediate effect is produced in response to the actuation of the contacts b and d of the relay 56 to their picked-up or closed positions.

It will thus be seen that the motoring current is successively increased in two steps by the successive removal of the shunt connection around the field windings of the motors and the shunt connection established around the resistor 36. This provides a smooth accelerating characteristic.

When the speed of the motors and consequently the speed of the car increases in response to the increased torque caused by the increased motoring current, the current supplied to the motors automatically reduces due to the increasing counter-electromotive force generated in the motors. When the current supplied to the motors reduces sufficiently that the voltage-drop across the resistor 52 in the motor circuit is insufficient to provide adequate current through the relay 48 to maintain the relay picked-up, the contacts of the relay 48 are restored to their dropped-out position.

The restoration of the contact c of the relay 48 to its dropped-out or closed position does not result in the pick-up of the field shunting relay 54 because the self-holding contact a of the relay 54 is in its open position.

The restoration of the contact a of the relay 48 to its dropped-out or open position is ineffective to cause drop-out of the relay 56 because of the self-holding circuit established by the contact a of the relay 56 in the manner previously described.

The restoration of the contact b of the relay 48 to its dropped-out or closed position establishes a circuit for energizing the magnet winding 81a of the stepping relay 42 operating the rheostat 39. This circuit extends from the positive bus wire 101 by way of a branch wire 161, back contact e of the field shunting relay 54 in its dropped-out or closed position, a wire 162, a wire 163, controller switch 30g, a wire 164, front contact d of the cushioning relay 56 now in its picked-up or closed position, a wire 165, back contact b of the relay 48, a wire 166, back contact e of the relay 46, a wire 167, back contact e of the relay 47, a wire 168, a wire 169, series-connected switch 85a and winding 81a of the stepping relay 42, and thence by a wire 170 including limit switch 45a to the negative terminal B— of the source of current.

The stepping relay 42 is thus operated in characteristic manner to cause rotation of the ratchet wheel 77, shaft 75 and the brush 92 in the direction indicated by the double-headed arrow in Fig. 1B thus progressively reducing the amount of the resistor 41 of the rheostat 39 in the motoring circuit.

If the current supplied to the motors due to the progressive cutting out of the resistor 41 increases above a value sufficient to cause pick-up of the current limit relay 48, the contacts of the relay 48 are again picked-up. The consequent actuation of the contact b of the relay 48 to its picked-up or open position interrupts the energizing circuit, just previously traced, for the magnet winding 81a of the stepping relay 42 and further rotation of the operating shaft 75 of the stepping relay and of the brush 92 is thus promptly stopped.

When the speed of the motors increases sufficiently following the pick-up of the relay 48 as to cause a sufficient reduction in the motoring current, due to the increase in the counter-electromotive force generated in the armature windings of the motors, the current limit relay 48 will again be restored to its dropped-out position. In such case, the circuit for energizing the magnet winding 81a of the stepping relay 42 will again be established and rotation of the shaft 75 and brush 92 continued to effect the further progressive cut-out of resistor 41.

It will thus be seen that, during the acceleration period, the stepping relay 42 is not continuously operated but is operated and stopped in rapid succession until the brush 92 attains the extremity of movement in the direction indicated by the double-headed arrow in which all of resistor 41 is cut out of the motor circuit. When this extremity of rotative movement of the shaft 75 of the stepping relay is attained, the arms 98, 99, and 100 cause operation of the limit switches 44, 45, and 45A, respectively.

Limit switch 45A is opened and interrupts the circuit for magnet winding 81a, thus preventing unnecessary consumption of current by the magnet winding.

Limit switch 45 is closed but such closing is without effect at this time.

The engagement of the contact finger b with the contact c of the limit switch 44 occurring at this time, however, causes energization of the winding w of the relay 46. This circuit may be traced from the positive bus wire 101 by way of the branch wire 161, back contact e of the field shunting relay 54, wire 162, wire 163, contact fingers b and c of the limit switch 44, wire 175, back contact b of the relay 49 in its dropped-out or closed position, a wire 176, winding w of the relay 46, wire 177, front contact b of the cushioning relay 56 to the negative terminal B— of the source of current.

The contacts of relay 46 are thus actuated to their picked-up positions.

The front contact b of relay 46 is effective in its picked-up or closed position to establish a shunt connection around the resistor 37 thus cutting it out of the motor circuit. At the same time, however, the pick-up of the transfer contact f of the relay 46 is effective to reconnect the resistor 41 of the rheostat 39 in the circuit in such a manner that it may be progressively cut-out of the circuit again upon the return movement of the brush 92 to its original position, this return movement of the brush 92 being effected in the manner presently to be described.

It will be seen that, with the transfer contact f of the relay 46 in its picked-up position, the circuit for supplying current to the motors extends from the trolley wire or third rail 141 to the brush 92 of the rheostat 39 in the manner previously traced, thence by way of the resistor 41, a wire 179, transfer contact f of the relay 46 in its picked-up position, wire 130, transfer contact f of the relay 47 in its dropped-out position, wire 129, wire 128, including the resistor 38 as well as contact b of the relay 46 (shunting the resistor 37) and resistor 52, thence by way of the winding w2 of the lock-out relay 59, wire 127, contact b of the brake control relay 57 to the ground connection at 148.

The resistance of the two resistors 41 and 37 is preferably the same, so that no change in the resistance of the motor circuit occurs due to the cutting of the resistor 37 out of the circuit and the reinsertion of the resistor 41 in the circuit.

The contacts d and e of the relay 46 are operative in their picked-up positions to effect a pole-changing connection to the windings 81a and 81b of the stepping relay 42 in such a manner as to render the magnet winding 81b operative in response to operation of the current limit relay 48 instead of the magnet winding 81a.

Thus, assuming that the current limit relay 48 remains dropped-out at the time that contact fingers b and c of limit switch 44 are engaged, the circuit for energizing the winding 81b of the stepping relay 42 is established in response to the pick-up of the relay 46. This circuit extends from the positive bus wire 101 by way of the branch wire 161, back contact e of the field shunting relay 54, wires 162 and 163, controller switch 30g, wire 164, contact d of the relay 56, wire 165, contact b of the current limit relay 48 in its dropped-out or closed position, wire 166, contact d of the relay 46 in its picked-up position, wire 181, contact d of the relay 47 in its dropped-out position, wire 182, and the series-connected switch 85b and magnet winding 81b of the stepping relay 42, to the negative terminal B— of the source of current.

As long as the current limit relay 48 remains dropped-out, therefore, the magnet winding 81b is alternately energized and deenergized in characteristic manner to cause rotation of the ratchet wheel 78 and the shaft 75 in the direction indicated by the single-headed arrow. The movement of the brush 92 in correspondence with such rotation of the shaft 75 is such as to progressively cut the resistor 41 out of the motoring circuit as it is returned toward its original starting position.

As the shaft 75 is rotated reversely in the direction of the single-headed arrow, the contact arms 98, 99, and 100 are correspondingly shifted. Thus the contact finger b of the limit switch 44 is restored to its normal position disengaging the contact finger c and engaging the contact finger a, while the contact finger b of the limit switch 45 is restored to its normal position disengaging the contact finger a.

Contact finger b of limit switch 45A is restored into engagement with contact finger a but such re-closing of this limit switch is without effect since the circuit for magnet winding 81a is not established. The relays 46 and 47, as previously indicated, are of the slow-acting type. Consequently, the contact finger b of the limit switch 44 reengages the contact finger a to establish a holding circuit for the relay 46, including the self-holding contact a thereof, thus maintaining the relay 46 picked-up thereafter notwithstanding the disengagement of the contact finger b of the limit switch 44 from the contact finger c.

This holding circuit for the winding of the relay 46 extends from the positive bus wire 101 by way of the branch wire 161, contact e of the field shunting relay 54, wires 162 and 163, contact fingers b and a of the limit switch 44, a wire 185, self-holding contact a of the relay 46, wire 176, winding w of the relay 46, wire 177, and contact b of the relay 56 to the negative terminal B— of the source of current.

The magnet winding 81b of the stepping relay 42 is alternately energized and deenergized to continue the retrogressive rotational movement of the shaft 75 and brush 92 under the control of the current limit relay 48 in the same manner as the magnet winding 81a is controlled by the relay 48. In other words, if the current in the motoring circuit becomes sufficient to cause pick-up of the relay 48, the previously traced circuit for energizing the magnet winding 81b is interrupted due to the actuation of the contact b of the relay 48 to its picked-up or open position, thereby causing cessation of operation of the stepping relay 42 and consequent stopping of rotation of the shaft 75 and brush 92.

If the acceleration of the motors continues at a sufficient rate, the current limit relay 48 will be restored to its dropped-out position due to reduction in motoring current caused by increasing counter-electromotive force generated in the motor armature windings. Thus alternate operation and non-operation of the magnet winding 81b will continue until the brush 92 of the rheostat 39 is restored to its initial position cutting out all of the resistor 41. At such time, the contact arm 98 engages the contact finger b of the limit switch 43 and bends it into engagement with the contact finger c, thereby establishing a circuit for energizing the winding w of the relay 47. This circuit extends from the positive bus wire 101 by way of the branch wire 161, contact e of the shunting relay 54, wire 162, contact fingers b and c of the limit switch 43, wire 187, back contact c of the current limit relay 49 in its dropped-out or closed position, wire 188, front contact c of the relay 46 now in its picked-up or closed position, wire 189, winding w of the relay 47, wire 177, and contact b of the relay 56 to the negative terminal B— of the source of current.

Upon the pick-up of the relay 47, the pole-changing contacts d and e thereof are effective to render the magnet winding 81b of the stepping relay 42 not operative and the magnet winding 81a operative. It will be seen that such is the case because tracing the circuit from the positive bus wire 101 to the contact b of the current limit relay 48 in the manner previously described, the circuit continues by way of the wire 166, contact d of the relay 46, wire 181, contact d of the relay 47, wire 169, switch 85a and magnet winding 81a of stepping relay 42 and thence through wire 170 and limit switch 45A to the negative terminal B— of the source of current.

Contact b of the relay 47 is effective in its picked-up position to establish a short circuit connection around the resistor 38 thereby cutting it out of the motoring circuit. At the same time, the transfer contact f of the relay 47 is effective in its picked-up position to change the connection of the resistor 41 in such a manner as to restore it in the motoring circuit. Since resistor 41 has the same resistance as resistor 38, no change in the resistance of the motor circuit is produced when resistor 41 is substituted for resistor 38. The circuit supplying current to the motors may now be traced from the trolley wire 141 through the motors and the wire 147 to the contact c of the brake control relay 57, thence by way of the wire 133, brush 92, resistor 41 of the rheostat 39, wire 132, contact f of the relay 47 in its picked-up position, wire 128, contact b of the relay 47, a wire 191, contact h of the relay 46, a wire 192, wire 128, resistor 52, wire 128, winding w2 of the lock-out relay 59, wire 127, and through the contact b of the emergency relay 57 to the ground connection at 148.

Assuming that the current limit relay 48 remains in its dropped-out position, the pick-up of the relay 47 accordingly establishes a circuit for energizing the magnet winding 81a. The magnet winding 81a is thus alternately energized and deenergized in its characteristic manner to rotate the ratchet wheel 77, shaft 75, and brush 92 in the direction indicated by the double-headed arrow to progressively cut-out the resistor 41 from the motoring circuit.

When the contact arm 98 leaves the initial position, in which it is shown, in its movement to the opposite extremity of movement thereof, the contact finger b of the limit switch 43 disengages the contact finger c and engages the contact finger a thereof. Disengagement of the contact finger b from the contact finger c of the limit switch 43 interrupts the circuit previously traced for energizing the winding of the relay 47, but due to the slow drop-out characteristic of the relay 47, a self-holding circuit is established for maintaining the winding of the relay 47 energized when the contact finger b engages the contact finger a of the limit switch 43. This circuit may be traced from the positive bus wire 101 by way of the branch wire 161, contact e of the shunting relay 54, wire 162, contact fingers b and a of the limit switch 43, a wire 193, contact finger a of the relay 47 in its picked-up or closed position, a wire 194, wire 188, contact c of the relay 46 in its picked-up or closed position, wire 189, winding w of the relay 47, wire 177, and contact b of the relay 56 to the negative terminal B— of the source of current.

The current limit relay 48 again functions in its usual manner to control the supply of current to the magnet winding 81a of the stepping relay 42 in accordance with the current in the motoring circuit to cause the brush 92 to be progressively shifted in the direction of the double-headed arrow toward the opposite extremity of the resistor 41 whereby to progressively cut the resistor 41 out of the motoring circuit.

When the brush 92 reaches the extremity of movement thereof in which the entire resistor 41 is cut out of the circuit, the contact arm 99 engages the contact finger b of the limit switch 45 and causes it to engage the contact finger a of the limit switch. A circuit is thereby established for energizing the winding of the shunting relay 54 to cause pick-up of the contacts thereof and the consequent shunting of the motor field windings 14a, 14b, 14c, and 14d.

The circuit for energizing the winding of the shunting relay 54 just established, may be traced from the positive bus wire 101 by way of the branch wire 155 including the controller switch 36j, wire 158, contact c of the relay 47 in its picked-up or closed position, a wire 197, contact fingers a and b of the limit switch 45, wire 138, winding w of the relay 54, and thence to the negative terminal B— of the source of current.

Due to the fact that the closed front contact e of the cushioning relay 56 parallels the back contact e of the shunting relay 54, the actuation of the back contact c of the shunting relay 54 to its picked-up or open position is ineffective to interrupt the holding circuit for the relays 46 and 47 previously traced.

With the contact arm 100 of the rheostat 39 engaging the contact finger b of the limit switch 45a and holding it out of engagement with the contact finger a, the circuit for the magnet winding 81a of the stepping relay 42 is interrupted independently of the current limit relay 48. Thus, when the car travels at a constant speed corresponding to its maximum speed due to the cut out of all of the resistors 36, 37, 38, and 41 from the motoring circuit as is the case at this time, the restoration of the current limit relay 48 to its dropped-out position is ineffective to cause the continued energization of the magnet winding 81a. Unnecessary consumption of current is thus prevented.

(c) Service braking operation

Let it now be assumed that the operator desires to apply the brakes to bring the car to a stop. To do so, the operator first restores the controller handle 28 to its Coasting position, holds it there momentarily for reasons hereinafter made apparent, and then shifts it into the braking zone to a degree corresponding to the desired degree of brake application.

When the controller handle 28 is shifted to its Coasting position from the accelerating zone, the corresponding closure of the controller switch 30f completes the circuit, previously described, for energizing the winding of the shunting relay 54 to maintain the shunting relay in its picked-up position. At the same time, the opening of the controller switch 30j in the Coasting position of the controller, interrupts the holding circuit for the cushioning relay 56, previously traced, and this relay is thus restored to its dropped-out position.

The restoration of the contact c of the relay 56 to its dropped-out position interrupts the shunt connection around the resistor 36, thereby cutting the resistor 36 into the dynamic braking circuit, which is established in the manner presently to be described.

The restoration of the contact e of the cushioning relay 56 to its dropped-out or open position interrupts the holding circuit for the two relays 46 and 47 and these relays are therefore simultaneously restored to their dropped-out positions.

The drop-out of the contact b of each of the relays 46 and 47 removes the shunt connection around the resistors 37 and 38, respectively, and these resistors are therefore cut into the dynamic braking circuit established in the manner presently to be described.

The restoration of the contact f of each of the relays 46 and 47 to the dropped-out position reconnects the resistor 41 of the rheostat 39 in the circuit with the resistors 37 and 38, the amount of the resistor 41 included in the circuit, depending upon the position of the brush 92. If the brush 92 is in its extreme right-hand position, the entire resistor is cut-out of the circuit.

The restoration of the controller switch 30b to its dropped-out or open position in response to the restoration of the controller handle 28 to the Coasting position thereof interrupts the circuit for energizing the winding of the brake control relay 57 and the contacts of this relay are thus restored to their dropped-out positions, thereby establishing the dynamic braking circuit previously described. At this time, however, with the field shunting relay 54 picked-up, the field shunting connections are established around the motor field windings by contacts b and c and consequently relatively low dynamic braking current flows in the circuit. Negligible dynamic braking effect is thus exerted at this time.

In the Coasting position of the controller handle 28, the controller switch 30e is closed, thereby shunting the resistor 51 and cutting it out of the circuit of the windings of the current limit relays 48 and 49.

The sensitivity of the relays 48 and 49 to the current flowing in the dynamic braking circuit is thus increased.

Under the circumstances described, the degree of the current in the dynamic braking circuit is substantially proportional to the speed of travel of the car. The current limit relays 48 and 49 thus respond to the current in the dynamic braking circuit as a measure of the speed of travel of the car.

If the degree of resistance in the dynamic braking circuit for the particular speed of the car is such that insufficient current is supplied to energize the winding of the current limit relay 48 to cause pick-up thereof, a circuit for energizing the magnet winding 81a of the stepping relay 42 is established assuming that the brush 92 is not in its extreme right-hand position. This circuit may be traced from the positive bus wire 101 by way of a branch wire 201 including the controller switch 30i, a wire 202 to the wire 165, thence by way of the contact b of the current limit relay 48, wire 166, contact e of the relay 46 in its dropped-out position, wire 167, contact e of the relay 47 in its dropped-out position, wires 168 and 169, switch 85a and magnet winding 81a of the stepping relay 42, wire 170, and the closed contacts b and a of the limit switch 45A to the negative terminal B— of the source of current.

The brush 92 is accordingly stepped around in the direction indicated by the double-headed arrow to its extreme right-hand position cutting out all of the resistor 41 of the rheostat 39.

At such time, if deenergization of the magnet winding 81a is not effected in response to the pick-up of the current limit relay 48, such deenergization is effected in response to the separation of the contact fingers b and a of the limit switch 45A.

On the other hand, if the current in the dynamic braking circuit for a particular speed of the car is sufficient to cause pick-up not only of the contacts of the current limit relay 48 but also the contacts of the current limit relay 49, a circuit is established for energizing the magnet winding 81b of the stepping relay 42 to cause the brush 92 to be shifted in the left-hand direction indicated by the single-headed arrow to cut an additional portion of resistor 41 into the circuit.

The circuit for energizing the magnet winding 81b extends from the positive bus wire 101 by way of the branch wire 201 including the controller switch 30i, wire 202, wire 165, a branch wire 203 including the front contact a of the current limit relay 49, contact d of the relay 46 in its dropped-out position, wire 181, contact d of the relay 47 in its dropped-out position, wire 182, and switch 85b and the magnet winding 81b of the stepping relay 42 to negative terminal B— of the source of current.

This operation of the rheostat 39 in the Coasting position of the controller handle 28 is termed the "spotting" operation and is for the purpose of adjusting the resistance in the dynamic braking circuit more nearly in accordance with the actual speed of the car so as to minimize the time required to adjust the resistance in the dynamic braking circuit to the degree corresponding to the degree of braking called for when the controller is subsequently shifted into the braking zone.

Now let it be assumed that the operator shifts the controller handle 28 into the braking zone, for example, to braking position 3.

As is apparent from Fig. 1A, the controller switch 30c is operated to open position in the braking position 1 and remains open thereafter for all braking positions of the controller handle 28. Consequently when controller handle 28 is shifted to braking position 3, as assumed, the circuit for energizing the winding $w1$ of the lock-out relay 59 is interrupted. The lock-out relay 59, however, has the winding $w2$ thereof energized by the current in the dynamic braking circuit and accordingly is maintained in picked-up position. The lock-out relay 59 has a slow-acting characteristic in order to provide a short interval of time in which to permit the build-up of dynamic braking current sufficient to energize the winding $w2$ to a degree necessary to maintain the lock-out relay picked-up.

In the braking position 1, controller switch 30$f$ is restored to open position thereby interrupting the circuit established thereby for energizing the winding of the field shunting relay 54. At the same time, the holding circuit for the winding of the relay 54 is interrupted due to the opening of the controller switch 30$k$ in the braking position 1 and subsequent braking positions. Thus, regardless of whether the current limit 48 is picked-up or dropped-out when the controller handle reaches braking position 1, the field shunting relay 54 is instantly restored to its dropped-out position.

The drop-out of the field shunting relay 54 is accordingly effective to open the shunt connections around the motor field windings due to the drop-out or opening of the contacts $b$ and $c$ thereof. The full energization of the field winding of the motors is accordingly effected and a substantial increase in the degree of dynamic braking current and consequently in the degree of dynamic braking effect is produced.

When the controller handle 28 leaves the Coasting position, the controller switch 30$e$ is again restored to open position, thereby cutting the resistor 51 into the circuit of the windings of the current limit relays 48 and 49. At the same time, the brush or contact arm 33 of the rheostat 32 associated with the controller 27 is shifted to insert a portion of the resistor 32$a$ thereof into circuit relation with the windings of the current limit relays 48 and 49 to render them operatively sensitive in accordance with the degree of displacement of the controller handle out of its Coasting position in exactly the same manner as for acceleration. In other words, as the degree of displacement of the controller handle 28 out of its Coasting position increases, resistance is progressively inserted or added in the circuit of the windings of the current limit relays 48 and 49, thereby requiring a higher current in the dynamic braking circuit proportional to the degree of displacement of the controller handle out of Coasting position to cause pick-up of the current limit relays 48 and 49.

The restoration of the contact $d$ of the field shunting relay 54 to its dropped-out or closed position is ineffective at this time to cause energization of the winding of the cushioning relay 56 for the reason that the controller switch 30$j$ is in open position. It will thus be seen that the cushioning relay 56 remains dropped-out during the braking operation as does the field shunting relay 54.

Assuming that the brush 92 is in its left-hand position in which the resistor 41 of the rheostat 39 is fully cut into the dynamic braking circuit, and that the dynamic braking current initially established upon the drop-out of the field shunting relay 54 is in excess of that required to produce the degree of dynamic braking called for by the controller 27, both the current limit relays 48 and 49 will be picked-up. A circuit will thus be established for energizing the magnet winding 81$b$ of the stepping relay 42 but due to the fact that the brush arm 92 is already in a position cutting in all of the resistance 41, the energization of the magnet winding 81$b$ is without effect. The circuit thus established for energizing the magnet winding 81$b$ extends from the positive bus wire 101 by way of the branch wire 161, back contact $e$ of the field shunting relay 54 in its dropped-out or closed position, wires 162 and 163, controller switch 30$h$ now in its closed position, wire 202, wire 165, front contact $a$ of the current limit relay 49 now in its picked-up or closed position, wire 203, contact $d$ of the relay 46 in its dropped-out position, wire 181, contact $d$ of the relay 47 in its dropped-out or closed position, wire 182, and switch 85$b$ and the magnet winding 81$b$ of the stepping relay 42 to the negative terminal B— of the source of current.

If, at the time the shunting relay 54 drops out, the dynamic braking current is sufficient to cause pick-up of only the current limit relay 48 and not of the current limit relay 49, a circuit is correspondingly established for energizing the magnet winding 81$a$ of the stepping relay 42. This circuit extends from the positive bus wire 101 to the controller switch 30$h$ as previously traced, thence by way of the wires 202 and 165, back contact $b$ of the current limit relay 48, wire 166, contact $e$ of the relay 46, wire 167, contact $e$ of the relay 47, wires 168 and 169, switch 85$a$ and the magnet winding 81$a$ of stepping relay 42, wire 170, and the contact fingers $a$ and $b$ of the limit switch 45A to the negative terminal B— of the source of current. The stepping relay 42 is accordingly operated to shift the brush 92 in the right-hand direction indicated by the double-headed arrow to progressively cut out resistor 41 from the dynamic braking circuit in accordance with the control exercised by the current limit relay 48. That is, if the dynamic braking current produced in response to the cutting out of the resistor 41 is sufficient to pick-up the contacts of the current limit relay 48, the circuit for the magnet winding 81$a$ will be interrupted at contact $b$ of the current limit relay 48 and further movement of the brush 92 will be stopped until such time as the dynamic braking current again reduces sufficiently to permit drop-out of the contacts of the current limit relay 48. The stepping relay 42 will thus be operated to shift the brush 92 in steps until it reaches the extreme right-hand position thereof in which the entire resistor 41 is cut out of the dynamic braking circuit.

If the brush arm 92 had been in its extreme right-hand position cutting out all of the resistor 41 at the time the field shunting relay 54 is dropped-out, the operation now about to be described would be immediately effected in response to the drop-out of the relay 54.

Due to the fact that the contact finger $b$ is caused to engage the contact finger $c$ of the limit switch 44 by engagement of the contact arm 98 with the contact finger $b$, a circuit is established for energizing the winding $w$ of the relay 46. This circuit extends from the positive bus wire 101, by way of the branch wire 161, contact $e$ of the field shunting relay 54, wires 162 and 163, contact fingers $b$ and $c$ of the limit switch 44, wire 175, back contact $b$ of the current limit relay 49, wire 176 winding w of the relay 46, wire 177, and a branch wire 205 including the controller switch 30d which is closed in the coasting position and all braking positions of the controller 27, to the negative terminal B— of the source of current.

The contacts of the relay 46 are accordingly actuated to their picked-up positions. The contact b of the relay 46 is effective in its picked-up or closed position, as during acceleration, to shunt the resistor 37 and thereby cut it out of the dynamic braking circuit. At the same time, the contact f of the relay 46 is effective in its picked-up position to reconnect the resistor 41 in the dynamic braking circuit in the same manner as described during the accelerating operation.

If the dynamic braking current at this time is still insufficient to cause pick-up of the contacts of the current limit relay 48, a circuit is accordingly established for energizing the magnet winding 81b of the stepping relay 42. This circuit extends from the positive bus wire 101 by way of the branch wire 161, contact e of the shunting relay 54, wires 162 and 163, controller switch 30h, wires 202 and 165, back contact b of the current limit relay 48, wire 166, contact d of the relay 46 in its picked-up position, wire 181, contact d of the relay 47 in its dropped-out position, wire 182, and switch 85b and magnet winding 81b of the stepping relay 42 to the negative terminal B— of the source of current.

The stepping relay 42 is accordingly operated to shift the brush 92 in the left-hand direction indicated by the single-headed arrow to progressively cut resistor 41 out of the dynamic braking circuit until such time as the dynamic braking current produced is sufficient to cause pick-up of the contacts of the relay 48. At such time, pick-up of the contact b of the relay 48 interrupts the circuit for the magnet winding 81b and further movement of the brush 92 is stopped until the dynamic braking current again reduces sufficiently to permit the drop-out of the contact b of the relay 48.

Movement of the brush arm 92 in the left-hand direction continues until the contact arm 98 causes the contact finger b of the limit switch 43 to engage the contact finger c and thereby establish a circuit for energizing the winding w of the relay 47.

This circuit extends from the positive bus wire 101 by way of the branch wire 161, contact e of the shunting relay 54, wire 162, contact fingers b and c of the limit switch 43, wire 187, back contact c of the current limit relay 49 in its dropped-out position, wire 188, contact c of the relay 46 in its picked-up position, wire 189, winding w of the relay 47, wire 177, and wire 205 including the switch 30d to the negative terminal B— of the source of current.

Contact b of relay 47 is effective in its picked-up or closed position to establish a shunt connection around the resistor 38, thereby cutting it out of the dynamic braking circuit. At the same time, contact f of the relay 47 is effective in its picked-up position to reconnect the resistor 41 in the dynamic braking circuit.

If the dynamic braking current at this time is insufficient to cause pick-up of the contacts of the current limit relay 48, a circuit is established in response to the pick-up of the relay 47 to cause energization of the magnet winding 81a of the stepping relay. This circuit extends from the positive bus wire 101 by way of the branch wire 161, contact e of the field shunting relay 54, wires 162 and 163, controller switch 30h, wire 202, wire 165, back contact b of the current limit relay 48, wire 166, contact d of the relay 46 in its picked-up position, wire 181, contact d of the relay 47 in its picked-up position, wire 169, switch 85a and the magnet winding 81a of the stepping relay 42, wire 170, and the closed limit switch 45A to the negative terminal B— of the source of current.

The stepping relay 42 is accordingly operated to shift the brush 92 in the right-hand direction, indicated by the double-headed arrow to progressively cut resistor 41 out of the dynamic braking circuit. As in previous instances, if the dynamic braking current increases sufficiently in response to movement of the brush 92 to cause pick-up of the current limit relay 48, contact b of the relay 48 is correspondingly picked-up to interrupt the energizing circuit for magnet winding 81a of the stepping relay 42 and further movement of the brush 92 is stopped.

The current limit relay 48 is accordingly effective to regulate the degree of dynamic braking current in accordance with the setting of the controller handle 28 to effect a corresponding degree of dynamic braking effect until such time as the brush 92 of the rheostat 39 reaches the right-hand extremity of movement at which time the entire resistor 41 is again cut out of the circuit. Thereafter, no further resistance remains to be cut out of the dynamic braking circuit and the degree of dynamic braking effect is determined solely in accordance with the speed of the car. The dynamic braking effect in characteristic manner therefore reduces with reducing speed of the car.

When the dynamic braking current reduces to a sufficiently low degree as the car approaches a stop, the current energizing the winding w2 of the lock-out relay 59 is insufficient to maintain the contact of the relay in its picked-up position and the contact is accordingly restored to its dropped-out position.

The restoration of the contact of the lock-out relay 59 to its dropped-out or open position interrupts the circuit, previously traced, for maintaining the winding w1 of each of the relays 66 and the associated auxiliary solenoids 21b of the spring-applied brake devices energized.

Upon deenergization of the solenoids 21b, the spring-applied brakes are applied on the brake drums of the corresponding motor shafts. The reduction in the degree of dynamic braking effect, as the car approaches a stop, is thus counteracted to some extent by the braking effect exerted by the spring-applied brakes. The spring-applied brakes remain effective thereafter and while the car is stopped, as a parking brake.

Now let it be supposed that initially or at some time during the brake application the operator shifts the controller handle 28 to braking position 4. In such case, the dynamic braking operation is effected as previously described. In this connection, the resistor of the rheostat 32 associated with the controller 27 is so arranged that no additional resistance is cut into the circuit of the windings of the current limit relays 48 and 49 in braking position 4 and 5 of the controller. Consequently, the current limit relays 48 and 49 function to regulate the degree of the dynamic braking effect to the same degree as in braking position 3.

With the controller handle 28 in braking position 4, the switch 30n is closed, thereby energizing the winding of the relay 62 and establishing the circuit for energizing the magnet winding 25a of the magnetic track brake devices to the lowest degree by reason of the fact that the resistors 64 and 65 are included in series relation in the circuit of the magnetic track brake windings 25a. The magnetic track brake devices 25 are accordingly operated into frictional engagement with the track rails and exert a braking effect on the car additional to that provided by the dynamic brake.

If the operator shifts the controller handle 28 to braking position 5, controller switch 30m is also closed and thereby establishes the circuit for energizing the relay 63. Relay 63 is thus actuated to shunt the resistor 65 to cut it out of the circuit of the magnetic track brake windings 25a. The current energizing the magnetic track brake windings 25a is thus increased correspondingly to increase the degree of braking effect produced by the magnetic track brake devices.

If the operator further shifts the controller handle 28 to the braking position 6, no further increase in the degree of energization of the magnetic track brake windings takes place. A higher degree of application of the magnetic track brakes may, however, be effected in the Emergency position of the controller handle, as explained hereinafter.

It will be noted that as the controller handle 28 is shifted to braking position 6 the amount of the resistor 32a of the rheostat 32 included in series circuit with the windings of the current limit relays 48 and 49 is correspondingly increased so that the current limit relays are correspondingly conditioned to regulate the dynamic braking current and thus the dynamic braking effect to a correspondingly higher degree.

It will accordingly be seen that the degree of dynamic braking effect produced during service braking applications is in accordance with the degree of displacement of the controller handle 28 from the Coasting position and that the magnetic track brakes are not applied until after a predetermined degree of displacement of the controller handle has taken place, after which the degree of magnetic track brake effect is progressively increased in steps. In all cases, the spring-applied brakes are automatically applied only as the car approaches a stop in response to the drop-out of the lock-out relay 59, controlled by the degree of dynamic braking current.

(d) *Emergency braking operation*

Emergency application of the brakes may be effected by the operator shifting the controller handle 28 to its Emergency position wherein controller switch 30a is opened, or by the operator intentionally or accidentally releasing the downward pressure on the controller handle 28 to open the deadman switch 29, or by operation of the conductor's switch 71 to its open position. Any of the above operations interrupts the emergency wire circuit, previously traced, and causes deenergization of the emergency relay 58 and a consequent drop-out of the contacts thereof.

The drop-out of the emergency relay 58 interrupts the circuit for the brake control relay 57 if this circuit has not previously been interrupted at controller switch 30b, as might be the case when the controller handle 28 is in an accelerating position and the operator relieves the pressure on the controller handle to cause opening of the deadman switch 29 or opening of the conductor's switch 71 occurs.

If the brake control relay 57 has already been restored to its dropped-out position in response to the opening of the controller switch 30b then the drop-out of the emergency relay 58 is without effect as to relay 57.

The restoration of the contact b of the emergency relay 58 to its dropped-out or open position interrupts the circuit for energizing the winding w1 of the lock-out relay 59 to cause drop-out of the relay in the event that the controller handle is in an accelerating position and has not been shifted to a braking position to open controlled switch 30c.

The restoration of the back contact c of the emergency relay 58 to its dropped-out or closed position establishes a shunt connection around the resistors 37, 38 and 41, thereby promptly cutting substantially all of the resistance out of the dynamic braking circuit.

In the case of an emergency application of the brakes initiated by operation of the deadman switch 29 or by the conductor's switch 71, with the controller handle 28 in an accelerating position, the holding circuit for the cushioning relay 56 remains established and the relay thus remains picked-up. Consequently the resistor 36 in the dynamic braking circuit remains shunted, that is, cut out of the circuit. This provides a slightly higher dynamic braking current than in the case of an emergency application of the brakes initiated by operation of the controller handle 28 to Emergency position. It will be seen that this is so because when the controller handle 28 is operated to Emergency position, the pick-up and holding circuits for the cushioning relay 56 are both interrupted due to the open position of the controller switch 30j. Thus with relay 56 dropped-out, resistor 36 is cut into the dynamic braking circuit.

In the case of an emergency application of the brakes, initiated by operation of the controller handle 28 to its Emergency position, field shunting relay 54 is deenergized because of the interruption of the holding circuit therefor in response to the opening of the controller switch 30k. In the case of an emergency application of the brakes initiated by operation of the deadman switch 29 or the conductor's switch 71, with the controller handle 28 in an accelerating position and the controller switch 30k correspondingly in closed position, deenergization of the winding of the shunting relay 54 is effected in response to the pick-up of the current limit relay 48 resulting from the high initial degree of dynamic braking current, the contact c of the relay 48 being thus correspondingly actuated to its picked-up or open position.

In either case, therefore, the field shunting relay 54 is restored to its dropped-out position during the emergency application of the brakes and consequently the shunt connection around the field windings of the motors is removed.

It will thus be seen that the maximum degree of dynamic braking current is produced in an emergency application of the brakes and a consequently maximum degree of dynamic braking effect is produced.

Variations of the dynamic braking current produced in response to variations in the speed of the car may cause a response of the current limit relays 48 or 49, which will operate in the usual manner to control the magnet windings 81a and 81b of the stepping relay 42 and operation of the relays 46 and 47. However, with all of the resistors 37, 38, and 41 shunted by contact c of the emergency relay, such operation is without effect except to vary such resistance more or less in accordance with the speed of the car.

The contact $d$ of the emergency relay 58 is effective when restored to its dropped-out or closed position to establish a circuit jointly with controller switch 30$l$ for energizing the winding of the relay 63. At the same time contact $e$ of emergency relay 58 is effective in its dropped-out or open position to open the circuit of the winding of relay 62, thus insuring drop-out of relay 62 if it is not already dropped-out. The pick-up of the relay 63 is thus effective to establish the circuit for energizing the magnet windings 25$a$ of the magnetic track brake devices to a maximum degree.

Due to the slow-acting characteristic of the lock-out relay 59, the dynamic braking current builds-up sufficiently to cause winding $w2$ to maintain the relay picked-up until the car reduces to a low speed in approaching a stop. At such time, the contact of the lock-out relay 59 is restored to its dropped-out position, thereby opening the circuit of the winding $w2$ of the relays 66 and of the auxiliary solenoids 21$b$ of the spring-applied brake devices. The spring-applied brake devices are thus applied in the same way as in a service application of the brakes, that is, only when the car approaches a stop and remain applied until such time as the car is again started.

If the operator desires to remove the controller handle 28, he must first shift it to the Non-operative position before the removal may be effected, as previously stated. In the Non-operative position of the controller handle, the various controller switches are all operated to open position, thereby deenergizing all of the relays or windings not previously deenergized and preventing the discharge of current from the source. Thus, in the Non-operative position of the controller handle, the controller switch 30$l$ opens the circuit for the winding of the relay 63, thereby deenergizing the magnetic windings 25$a$ of the magnetic track brake devices automatically notwithstanding the fact that the emergency relay 58 is in its dropped-out position. Of course, the spring-applied brakes remain applied while the controller handle is removed because the solenoids 21$a$ and 21$b$ are both deenergized.

Whenever the operator desires to start the car, following an emergency application of the brakes initiated by the operation of the deadman switch or conductor switch, these switches must first be closed before the car can be started in order to cause the emergency relay 58 to again be restored to its normal picked-up position.

When the operator desires to start the car after having removed the controller handle, he merely restores the controller handle to the operating shaft of the controller 27 and shifts it from the Non-operative position to the Coasting position. The apparatus is accordingly conditioned in the manner previously described and acceleration or braking may be effected as previously described. It will be understood, of course, that if the controller handle 28 is shifted from the Coasting position to a braking position while the car is at a standstill, there can of course be no application of the dynamic brakes. Thus the lock-out relay 59 will be instantly restored to its dropped-out position and the spring-applied brake will be instantly applied, and remain applied in all braking positions of the controller handle. The magnetic track brake device will of course be applied in varying degree as the controller handle is progressively shifted into service braking positions 4, 5, and 6 and Emergency position.

Summary

Summarizing, it will be seen that I have disclosed a propulsion and braking control system for a vehicle, such as a railway car, having propulsion motors and wherein a plurality of electrical braking devices are employed including the propulsion motors of the car acting as dynamic brakes, electromagnetic track brakes, and electrically controlled spring-applied parking brakes of the friction type.

A combination propulsion and braking controller is provided having a single controller handle shiftable in one direction from a Coasting position into the accelerating zone thereof and in the opposite direction from the Coasting position into the braking zone thereof. The degree of displacement of the controller handle out of Coasting position into the accelerating zone determines the rate of acceleration of the car. Similarly, the degree of displacement of the controller handle out of Coasting position into the braking zone determines the degree of braking effect produced and consequently the rate of deceleration or retardation of the car.

The propulsion motor control includes mechanism automatically controlled according to the current supplied to the propulsion motors or according to the dynamic braking current to progressively cut-out resistance or progressively insert resistance to control the rate of acceleration or the degree of dynamic braking effect in accordance with the position of the controller handle. The automatic mechanism for controlling the resistance in the motor circuit, both during accelerating and braking operations, includes a rheostat which is operated in one or the other direction to cut-out or insert resistance in the motor circuit by means of a stepping relay. The arrangement is such that when the rheostat is operated to cut-out all of the resistance thereof from the motor circuit, a change of connections is effected to reinsert the resistance of the rheostat in the circuit while cutting-out an equivalent resistance from the motor circuit. Thus a major variation in the amount of resistance in the motor circuit may be produced progressively by progressively varying the resistance of a rheostat having a fraction of the total resistance in the motor circuit repeatedly. This general principle of operation is broadly not my invention, because it is disclosed in the above mentioned Tritle Patent 2,120,956. The specific mechanism which I provide, including particularly the rheostat operated by a stepping relay whereby the operation is effected, is however believed to be novel.

The system further includes an apparatus whereby magnetic track brake devices are applied upon a predetermined displacement of the brake controller out of Coasting position and whereby the degree of application of the magnetic track brakes is progressively increased as the displacement of the controller handle out of Coasting position thereafter increases.

A lock-out relay is provided whereby to maintain spring-applied solenoid-released brakes in release position in response to the dynamic braking current until such time as the dynamic braking current reduces to a low degree at the time the speed of the car is reduced to a low degree as it approaches a stop. At such time, application of the spring-applied brakes is automatically effected. The spring-applied brakes thus serve as a parking brake and also to supplement or compensate for the diminution in the degree of dynamic braking effect at low speed.

Emergency applications of the brakes may be produced either by operation of the combination propulsion and brake controller, or by a deadman device, or by a conductor's switch. In an emergency application of the brakes, maximum dynamic braking and maximum magnetic track braking is automatically produced substantially instantaneously. As in service applications of the brakes, the spring-applied solenoid-released brakes are suppressed for the major portion of the braking cycle and applied only when the car reduces to low speed.

Having now described my invention, what I claim as new and desire to secure by Letters Patent, is:

1. In a motor control system, the combination of means for establishing a motor circuit, a plurality of motor controlling resistors in the motor circuit, a reversible stepping relay operative in opposite directions between two extreme positions thereof to progressively vary the amount of one of said resistors included in the motor circuit, means controlled according to the current in the motor circuit for controlling the operation of said stepping relay, means effective in response to the complete exclusion of said resistor from the motor circuit following operation of said stepping relay in one direction to one extreme position for causing another of said resistors to be cut out of the motor circuit and for causing said one resistor to be reconnected into the motor circuit in a manner to be progressively excluded from the circuit in response to operation of the stepping relay in the opposite direction, said last means being effective to control the stepping relay in a manner to reverse the direction of operation of said stepping relay whenever it reaches an extreme position thereof.

2. In a motor control system, the combination of means for establishing a motor circuit, a plurality of motor controlling resistors in the motor circuit, a stepping relay operative reversibly between two extreme positions for progressively varying the amount of one of said resistors included in the motor circuit, means controlled according to the current in the motor circuit for controlling the operation of the stepping relay, means effective when the said stepping relay reaches one of its extreme positions in which the said one resistor is completely excluded from the motor circuit for cutting another of said resistors out of the circuit, for effecting reversal of the stepping relay, and for reconnecting said one resistor in the motor circuit in a manner to be progressively excluded as the stepping relay moves toward the other extreme position, and means effective when the stepping relay reaches said other extreme position in which the said one resistor is again completely excluded from the motor circuit for cutting another of said resistors out of the motor circuit, for reversing said stepping relay, and for reconnecting the said one resistor in the circuit in a manner such that movement of the stepping relay toward the said one extreme position is again effective to progressively exclude said resistor from the motor circuit.

3. In a motor control system, the combination of means for establishing a motor circuit, a resistor in the motor circuit, a reversible stepping relay operative in one direction to progressively exclude said resistor from the motor circuit and operative in the opposite direction to progressively include said resistor in the motor circuit, and a pair of current-responsive devices one of which is operatively responsive to a certain current in the motor circuit and the other of which is operatively responsive to a certain higher current in the motor circuit, said current-responsive devices cooperating to control said stepping relay in such a manner that so long as both of said current-responsive devices are not operated operation of the stepping relay to cause progressive exclusion of said resistor from the motor circuit is effected, that when said one current-responsive device only is operated operation of the stepping relay is stopped, and that when both of said current-responsive devices are operated operation of said stepping relay to cause progressive inclusion of said resistor in the motor circuit is effected.

4. In a motor control system, the combination of means for establishing a motor circuit, a resistor in the motor circuit, a reversible stepping relay operative in one direction to progressively exclude said resistor from the motor circuit and operative in the opposite direction to progressively include said resistor in the motor circuit, a pair of current-responsive devices one of which is operatively responsive to a certain current in the motor circuit and the other of which is operatively responsive to a certain higher current in the motor circuit, said current-responsive devices cooperating to control said stepping relay in such a manner that so long as both of said current-responsive devices are not operated operation of the stepping relay to cause progressive exclusion of said resistor from the motor circuit is effected, that when said one current-responsive device only is operated operation of the stepping relay is stopped, and that when both of said current-responsive devices are operated operation of said stepping relay to cause progressive inclusion of said resistor in the motor circuit is effected, and means for varying the degree of current in the motor circuit to which said current-responsive devices are respectively operatively responsive.

5. In a motor control system, the combination of a controller shiftable different degrees out of a certain position and effective thereby to establish a motor circuit, a resistor in the motor circuit, a reversible stepping relay operative in one direction to progressively exclude said resistor from the motor circuit and operative in the opposite direction to progressively include said resistor in the motor circuit, a pair of current-responsive devices one of which is operatively responsive to a certain current in the motor circuit and the other of which is operatively responsive to a certain higher current in the motor circuit, said current-responsive devices cooperating to control said stepping relay in such a manner that so long as both of said current-responsive devices are not operated operation of the stepping relay to cause progressive exclusion of said resistor from the motor circuit is effected, that when said one current-responsive device only is operated operation of the said relay is stopped, and that when both of said current-responsive devices are operated operation of said stepping relay to cause progressive inclusion of said resistor in the motor circuit is effected, and means effective in accordance with the degree of displacement of the controller out of its certain position for varying the degree of current in the motor circuit to which the current responsive devices are respectively operatively responsive.

6. In a motor control system, the combination of means providing a motor circuit, a motor controlling resistor in the motor circuit, a stepping relay having a rotary armature and two windings one of which is effective upon repeated alternate energization and deenergization to cause step-by-step rotation of the armature of the relay in one direction and the other winding of which is effective upon repeated alternate energization and deenergization to cause step-by-step rotation of the armature in the opposite direction, means operated by the armature of the stepping relay for progressively increasing or decreasing the amount of said resistor in the motor circuit depending upon the direction of rotation of the armature, and means controlled according to the current in the motor circuit for selectively rendering one or the other of said windings operative.

7. In a motor control system, the combination of means providing a motor circuit, a motor controlling resistor in the motor circuit, a stepping relay having a rotary armature and two windings one of which is effective upon repeated alternate energization and deenergization to cause step-by-step rotation of the armature of the relay in one direction and the other winding of which is effective upon repeated alternate energization and deenergization to cause step-by-step rotation of the armature in the opposite direction, means operated by the armature of the stepping relay for progressively increasing or decreasing the amount of said resistor in the motor circuit depending upon the direction of rotation of the armature, and means for causing selective operation of said windings in a manner such that the current in the motor circuit is regulated to a substantially constant value.

8. In a motor control system, the combination of means providing a motor circuit, a motor controlling resistor in the motor circuit, a stepping relay having a rotary armature and two windings one of which is effective upon repeated alternate energization and deenergization to cause step-by-step rotation of the armature of the relay in one direction and the other winding of which is effective upon repeated alternate energization and deenergization to cause step-by-step rotation of the armature in the opposite direction, means operated by the armature of the stepping relay for progressively increasing or decreasing the amount of said resistor in the motor circuit depending upon the direction of rotation of the armature, means for causing selective operation of said windings in a manner such that the current in the motor circuit is regulated to a substantially constant value, and means controlling the last said means in a manner to render said last means effective to cause regulation of the current in the motor circuit to any one of a plurality of selected substantially constant values.

9. In a motor control system, the combination of means providing a motor circuit, a motor controlling resistor in the motor circuit, a stepping relay including a rotary armature and two windings, one of said windings being effective upon repeated alternate energization and deenergization to progressively rotate the armature in one direction and the other of said windings being effective upon repeated alternate energization and deenergization to progressively rotate the armature in the opposite direction, means movable according to the rotary movement of the armature of said stepping relay for progressively decreasing or progressively increasing the amount of said resistor in the motor circuit depending upon the direction of movement thereof, two current-responsive devices, and means associating said current-responsive devices with the motor circuit in such a manner that one of said current-responsive devices is operatively responsive only to a current in the motor circuit exceeding a certain value and the other of said current-responsive devices is operatively responsive only to a current in the motor circuit exceeding a certain higher value, said two current-responsive devices cooperating in such a manner that when both of said current-responsive devices are not operated one of the windings of said stepping relay is alternately energized and deenergized so as to cause operation of the armature in one direction to cause a progressive decrease of the amount of the resistor in the motor circuit, so that when only said one of the current-responsive devices is operated both of the windings of said stepping relay are deenergized and operation of the stepping relay thereby stops, and so that when both of said current-responsive devices are operated the other of the windings of said stepping relay is alternately energized and deenergized to cause operation of the armature of the stepping relay in a direction to cause a progressive increase in the amount of said resistor in the motor circuit.

10. In a motor control system, the combination of means for establishing a motor circuit, a motor controlling resistor in the motor circuit, a stepping relay including a rotary armature and two windings, one of said windings being effective upon repeated alternate energization and deenergization to progressively rotate the armature in one direction and the other of said windings being effective upon repeated alternate energization and deenergization to progressively rotate the armature in the opposite direction, means movable in accordance with the movement of the armature of said stepping relay in one direction to progressively decrease the amount of the resistor in the motor circuit and in accordance with the movement of the armature of the stepping relay in the opposite direction to progressively increase the amount of the resistor in the motor circuit, and means responsive to the current in the motor circuit for controlling the windings of said stepping relay in such a manner that when the current in the motor circuit is less than a certain value one of said windings is alternately energized and deenergized repeatedly, when the current in the motor circuit exceeds said certain value but is less than a certain higher value both of said windings are deenergized, and when the current in the motor circuit exceeds said certain higher value the other of said windings is alternately energized and deenergized repeatedly.

11. In a motor control system, the combination of a controller operative different degrees out of a certain position to establish a motor circuit, a motor controlling resistor in the motor circuit, a stepping relay including a rotary armature and two windings, one of said windings being effective upon repeated alternate energization and deenergization to progressively rotate the armature in one direction and the other of said windings being effective upon repeated alternate energization and deenergization to progressively rotate the armature in the opposite direction, means movable in accordance with the movement of the armature of said stepping relay in one direction to progressively decrease the amount of the resistor in the motor circuit and in accordance with the movement of the armature of the stepping relay in the opposite direction to progressively increase the amount of the resistor in the motor circuit, means responsive to the current in the motor circuit for controlling the windings of said stepping relay in such a manner that when the current in the motor circuit is less than a certain value one of said windings is alternately energized and deenergized repeatedly, when the current in the motor circuit exceeds said certain value but is less than a certain higher value both of said windings are deenergized, and when the current in the motor circuit exceeds said certain higher value the other of said windings is alternately energized and deenergized repeatedly, and means effective in accordance with the degree of displacement of the controller out of its certain position for progressively increasing the said certain value of current and the said certain higher value of current in the motor circuit to which the last said means is responsive.

12. In a control system for a motor having a field winding, the combination of a controller operative out of a certain position to establish a motor circuit, a shunting relay effective when picked-up to shunt the field winding of the motor and when dropped-out to remove the shunt connection from the field winding, means effective in the said certain position of the controller for causing pick-up of said relay, means for establishing a holding circuit for maintaining said shunting relay picked-up when said controller is initially moved out of its said certain position, current-responsive means responsive to the current in the motor circuit and effective to interrupt said holding circuit to cause drop-out of said shunting relay when the current in the motor circuit exceeds a certain value, a motor controlling resistor in the motor circuit, operating means for progressively excluding said resistor from the motor circuit, and means effective in response to the drop-out of the shunting relay for rendering said current-responsive means effective to control the said operating means in a manner to cause it to progressively exclude said resistor from the motor circuit.

13. In a control system for a motor having a field winding, the combination of a controller operative out of a certain position to establish a motor circuit, a shunting relay effective when picked-up to shunt the field winding of the motor and when dropped-out to remove the shunt connection from the field winding, means effective in the said certain position of the controller for causing pick-up of said relay, means for establishing a holding circuit for maintaining said shunting relay picked-up when said controller is initially moved out of its said certain position, current-responsive means responsive to the current in the motor circuit and effective to interrupt said holding circuit to cause drop-out of said shunting relay when the current in the motor circuit exceeds a certain value, a motor controlling resistor in the motor circuit, a stepping relay having a rotary armature effective upon rotation to progressively exclude said resistor from motor circuit, and means effective in response to the drop-out of said shunting relay for rendering said current-responsive means effective to control said stepping relay in a manner to cause it to progressively exclude said resistor from the motor circuit.

14. In a control system for a motor having a field winding, the combination of a controller having a certain position in which a dynamic braking circuit for the motor is established and operative out of said certain position through a plurality of positions in which the dynamic braking circuit is maintained, a shunting relay effective when picked-up to cause shunting of the field winding of the motor and when dropped-out to cause unshunting of the field winding, means effective in said certain position of the controller for causing pick-up of said shunting relay, means for establishing a self-holding circuit for said shunting relay to maintain said relay picked-up after the controller is shifted out of its said certain position, current-responsive means responsive to current exceeding a certain value in the dynamic braking circuit for interrupting the self-holding circuit of said shunting relay to thereby cause drop-out of the relay, a plurality of fixed resistors and one variable resistor in the dynamic braking circuit, a reversible stepping relay having a rotary armature operative to cause progressive exclusion of said variable resistor from the dynamic braking circuit, means responsive to the drop-out of said shunting relay for rendering said current-responsive means effective to control the stepping relay in a manner to progressively exclude said variable resistor from the dynamic braking circuit, means effective upon operation of the stepping relay in one direction to completely exclude the variable resistor from the motor circuit for cutting one of said fixed resistors out of the circuit, for effecting reversal of the stepping relay, and for reconnecting said variable resistor in the circuit in such a manner as to be progressively excluded in response to the operation of the stepping relay in the reverse direction, means effective upon the second exclusion of said variable resistor from the motor circuit for cutting another of said fixed resistors out of the motor circuit, for effecting reversed operation of said stepping relay in the said one direction again and for reconnecting said variable resistor in the dynamic braking circuit in such a manner as to be again progressively excluded in response to the operation of the stepping relay in the said one direction, and means effective upon the complete exclusion of said variable resistor upon the motor circuit in response to the last-mentioned operation of the stepping relay for causing pick-up of said shunting relay and the consequent shunting of the field winding of the motor.

15. In a propulsion and braking control system for a vehicle having one or more propulsion motors, the combination of means for alternatively establishing a propulsion circuit or a dynamic braking circuit for the one or more motors, a resistor connected in either the propulsion circuit or the dynamic braking circuit, a stepping relay operative to vary the amount of the resistor included in either the propulsion circuit or the dynamic braking circuit, and means controlled by either the propulsion current or the dynamic braking current for controlling the operation of said stepping relay.

16. In a propulsion and braking control system for a vehicle having one or more propulsion motors, the combination of a controller having a coasting position in which a dynamic braking circuit for the one or more motors is established, said controller being operative different degrees out of said coasting position in one direction into a propulsion zone to establish a propulsion circuit for the one or more motors and operative different degrees out of the coasting position in the opposite direction into a braking zone in which the dynamic braking circuit is maintained, a resistor connected in either the propulsion circuit or the dynamic braking circuit, a stepping relay operative to vary the amount of said resistor included in either the propulsion circuit or the dynamic braking circuit, current-responsive means controlled according to the degree of current in either the propulsion circuit or the dynamic braking circuit for controlling the operation of said stepping relay, and means controlled according to the degree of displacement of the controller out of its coasting position into either the propulsion zone or the braking zone for correspondingly varying the degree of current to which the current-responsive means is operatively responsive.

17. In a motor control system, the combination of means for establishing a dynamic braking circuit for the motor, a resistor in said circuit, a stepping relay operative to vary the amount of the resistor included in the circuit, current-responsive means responsive according to the degree of current in the dynamic braking circuit for controlling the operation of said stepping relay, and means governing said current-responsive means in such a manner as to cause it to control the operation of the stepping relay in a manner to include an amount of said resistor in the dynamic braking circuit upon the initial establishment thereof substantially in accordance with the speed of the vehicle.

18. In a brake control system for a vehicle driven by a propulsion motor having a field winding, the combination of a controller having a certain position establishing a dynamic braking circuit for said motor in which the field winding of the motor is shunted and operative different degrees out of said certain position to maintain the dynamic braking circuit and at the same time cause unshunting of the field winding of the motor, a resistor in the motor circuit, a stepping relay operative to vary the amount of the resistor included in the dynamic braking circuit, current-responsive means for controlling the operation of the stepping relay, and means effective in the said certain position of the controller for rendering the current-responsive means operatively sensitive to a relatively low current and effective upon operation of the controller out of said certain position for rendering said current-responsive means operatively sensitive to a relatively high current.

19. In a brake control system for a vehicle driven by a propulsion motor having a field winding, the combination of a controller having a certain position establishing a dynamic braking circuit for said motor in which the field winding of the motor is shunted and operative different degrees out of said certain position to maintain the dynamic braking circuit and at the same time cause unshunting of the field winding of the motor, a resistor in the motor circuit, a stepping relay operative to vary the amount of the resistor included in the dynamic braking circuit, current-responsive means for controlling the operation of the stepping relay, means effective in the said certain position of the controller for rendering the current-responsive means operatively sensitive to a relatively low current and effective upon operation of the controller out of said certain position for rendering said current-responsive means operatively sensitive to a relatively high current, and means for rendering said current-responsive means operatively sensitive to different degrees of current in the dynamic braking circuit while the controller is out of its said certain position substantially in accordance with the degree of displacement of the controller out of its said certain position.

20. In a brake control system for a vehicle having a propulsion motor, the combination of means for establishing a dynamic braking circuit for the motor, a resistor in the dynamic braking circuit, a stepping relay operative to vary the amount of the resistor in the circuit, and means responsive to the current in the dynamic braking circuit for controlling said stepping relay in a manner to cause it to so vary the amount of the resistor in the circuit as to regulate the dynamic braking current to a substantially constant value.

21. In a brake control system for a vehicle having a propulsion motor, the combination of means for establishing a dynamic braking circuit for the motor, a resistor included in the circuit, a reversible stepping relay operative in one direction to progressively increase the amount of the resistor in the circuit and operative in the opposite direction to progressively reduce the amount of the resistor in the circuit, and means responsive to the current in the dynamic braking circuit for controlling the operation of the stepping relay in such a manner as to regulate the dynamic braking current to a substantially constant value.

22. In a control system for a vehicle propulsion motor having a field winding, the combination of a controller having a certain position and operative out of said certain position into a braking zone, means effective in the said certain position of the controller for establishing a dynamic braking circuit for the motor and effective to maintain said dynamic braking circuit throughout the braking zone, a shunting relay for shunting the field winding of the motor when picked-up and for unshunting the field winding when dropped-out, means effective in the said certain position of the controller for causing pick-up of said shunting relay and effective upon operation of the controller out of the said certain position for causing drop-out of said relay, a resistor connected in the dynamic braking circuit, a stepping relay operative to vary the amount of said resistor included in the dynamic braking circuit, current-responsive means responsive to the current in the dynamic braking circuit for controlling the operation of said stepping relay, and means controlled by said shunting relay for rendering said current-responsive means ineffective to control the operation of the said stepping relay after the controller is shifted out of its certain position unless the shunting relay is first dropped-out.

23. In a brake control system for a vehicle having one or more propulsion motors, the combination of means for establishing a dynamic braking circuit for the one or more motors, a fixed resistor and a variable resistor included in said dynamic braking circuit, a reversible stepping relay operative to progressively exclude said variable resistor from the dynamic braking circuit, current-responsive means responsive to the current in the dynamic braking circuit for controlling the operation of the stepping relay, and means effective upon the complete exclusion of said variable resistor from the dynamic braking circuit by operation of said stepping relay in one direction for cutting said fixed resistor out of the circuit, for effecting reversal of said stepping relay, and for reconnecting said variable resistor in the circuit in such a manner as to be progressively excluded a second time from the motor circuit in response to operation of the stepping relay in the reverse direction.

24. In a brake control system for a vehicle having one or more propulsion motors, the combination of means for establishing a dynamic braking circuit for the one or more motors, two fixed resistors and one variable resistor included in said circuit, a reversible stepping relay operative to progressively exclude said variable resistor from the circuit, current-responsive means responsive to the current in the dynamic braking circuit for causing operation of said stepping relay to progressively exclude said variable resistor from the dynamic braking circuit, means effective upon the initial exclusion of said variable resistor from said circuit for cutting one of said fixed resistors out of the circuit, for causing reversal of said stepping relay, and for reconnecting said variable resistor in the circuit in such a manner as to be progressively excluded from the circuit in response to the reversed operation of the stepping relay, means effective upon the exclusion of the variable resistor from the circuit a second time for cutting the second fixed resistor out of the dynamic braking circuit, for again reversing the stepping relay, and for reconnecting the variable resistor in the circuit in such a manner that the resistor is progressively excluded from the motor circuit a third time in response to operation of the stepping relay.

25. In a brake control system for a vehicle having one or more propulsion motors, the combination of means for establishing a dynamic braking circuit for the one or more motors, a plurality of fixed resistors and one variable resistor included in the dynamic braking circuit, a reversible stepping relay operative between two extreme positions to progressively exclude the variable resistor from the circuit, current-responsive means responsive to the current in the dynamic braking circuit for causing operation of said stepping relay, and means operative each time the variable resistor is completely excluded from the circuit in one or the other of said two extreme positions of the stepping relay for successively cutting said fixed resistors one by one out of the circuit and reinserting the variable resistor in the circuit in such a manner as to again be progressively excluded from the circuit upon reversed operation of the stepping relay, said last means being also effective to cause reversal of the stepping relay each time it reaches one or the other of its extreme positions.

26. In a brake control system for a vehicle having one or more propulsion motors, the combination of means for establishing a dynamic braking circuit for the one or more motors, a plurality of fixed resistors and one variable resistor included in the dynamic braking circuit, a reversible stepping relay operative between two extreme positions to progressively exclude the variable resistor from the circuit, current-responsive means responsive to the current in the dynamic braking circuit for causing operation of said stepping relay, means operative each time the variable resistor is completely excluded from the circuit in one or the other of said two extreme positions of the stepping relay for successively cutting said fixed resistors one by one out of the circuit and reinserting the variable resistor in the circuit in such a manner as to again be progressively excluded from the circuit upon reversed operation of the stepping relay, said last means being also effective to cause reversal of the stepping relay each time it reaches one or the other of its extreme positions, a normally energized circuit, and means responsive to deenergization of said circuit for cutting all of said fixed resistors and said variable resistor out of the circuit.

27. In a brake control system for a vehicle having one or more propulsion motors the combination of means for establishing a dynamic braking circuit for the one or more motors, a resistor connected in said circuit, a stepping relay operative to progressively cut said resistor out of the circuit, current-responsive means responsive to the current in the dynamic braking circuit for controlling the operation of the stepping relay, a normally energized circuit, and means responsive to deenergization of said circuit for instantly cutting all of said variable resistor out of the circuit.

28. In a brake control system for a vehicle having one or more propulsion motors, the combination of a controller effective in a certain position thereof to establish a dynamic braking circuit for the one or more motors and displaceable different degrees in one direction out of said certain position while maintaining said dynamic braking circuit, a resistor in said circuit, a stepping relay operative to progressively exclude said resistor from said circuit, current-responsive means responsive to the current in said circuit for controlling the operation of said stepping relay, means effective in accordance with the degree of displacement of the controller out of its certain position to cause said current-responsive means to be operatively responsive to a progressively increasing degree of current in the dynamic braking circuit, electromagnetic track brake means having a winding, means effective to progressively increase the degree of energization of the winding of the said magnetic track brake means as the degree of displacement of the controller out of said certain position increases, a normally energized circuit, and means responsive to deenergization of said normally energized circuit for instantly cutting all of said resistor out of the dynamic braking circuit and causing energization of the winding of said magnetic track brake means to a maximum degree.

29. In a brake control system for a vehicle having one or more propulsion motors, the combination of a controller operative into and through a braking zone to establish and maintain a dynamic braking circuit for the one or more motors, spring-applied brake means for exerting a braking effect on the wheels of the vehicle, electroresponsive means effective while energized to maintain said spring-applied brake means released, a relay having two separate windings and a slow drop-out characteristic, said controller being effective in one certain position in the braking zone to cause energization of one winding of said relay and the consequent pick-up thereof and effective to cause deenergization of said one winding on displacement of controller out of said one certain position, means for causing energization of the other winding of said relay in accordance with the current in the dynamic braking circuit, said other winding being effective to maintain said relay picked-up as long as the dynamic braking current exceeds a certain value, said relay being effective while picked-up to maintain the electroresponsive means energized and thereby prevent application of the spring-applied braking means, and effective upon drop-out to effect deenergization of the electroresponsive means to cause application of the spring-applied braking means, the slow drop-out characteristic of the relay being such as to prevent the drop-out of the relay for a certain interval of time following displacement of the controller out of the said one certain position to permit build-up of the dynamic braking current in the circuit to a degree sufficient to cause the said other winding to maintain the relay picked-up.

30. In a brake control system for a vehicle having one or more propulsion motors, a controller effective in a certain position to establish a dynamic braking circuit for the one or more motors and displaceable different degrees in one direction out of said certain position, while maintaining said circuit, means controlled according to the degree of displacement of said controller out of the certain position for regulating the dynamic braking current to progressively increasing values, a normally energized circuit, and means responsive to deenergization of said normally energized circuit for rendering the current regulating means ineffective.

31. In a brake control system for a vehicle having one or more propulsion motors, the combination of a controller having a coasting position, a plurality of service braking positions and an emergency braking position, means effective in all of said positions of the controller for establishing a dynamic braking circuit for the one or more motors, means responsive to the current in the dynamic braking circuit for regulating the current in the circuit to a substantially constant value, and means effective only in the emergency position of said controller for rendering said current regulating means ineffective.

32. In a motor control system, the combination of means for establishing a motor circuit, a resistor in the motor circuit, a stepping relay operative to vary the amount of said resistor included in the motor circuit, said relay having an operating winding effective to cause continuing operation of the relay only in response to repeated alternate energization and deenergization of said winding, an energizing circuit on which the said operating winding of the relay operates, means effective to cause the repeated alternate energization and deenergization of said operating winding only while the said energizing circuit is conditioned to cause energization of said operating winding, and means operatively responsive according to the degree of current in the motor circuit for conditioning the energizing circuit alternatively to cause or to prevent energization of the operating winding.

33. In a motor control system, the combination of means for establishing a motor circuit, a resistor in the motor circuit, a reversible stepping relay operative in one direction to progressively increase the amount of said resistor in the motor circuit and operative in the opposite direction to progressively decrease the amount of said resistor in the motor circuit, said relay having two operating windings selectively effective to cause continuing operation of the relay in the one direction or in the opposite direction respectively only in response to repeated alternate energization and deenergization thereof, an energizing circuit for each of said operating windings on which the corresponding winding operates, means for selectively rendering one or the other of said circuits effective to cause energization of the corresponding winding, means associated with each of said windings effective to cause repeated alternate energization and deenergization thereof when the corresponding operating circuit is conditioned to cause energization thereof, and means operatively responsive according to the degree of current in the motor circuit for controlling both of said operating circuits.

34. In a motor control system, the combination of a controller operative out of a certain position to establish a motor circuit, a resistor in the motor circuit, a stepping relay operative to vary the amount of said resistor included in the motor circuit, said relay having a winding effective to cause continuing operation of the relay only in response to repeated alternate energization and deenergization thereof, an energizing circuit on which the said winding operates, means effective while said energizing circuit is conditioned to cause energization of said winding for effecting repeated alternate energization and deenergization of the winding, current responsive means responsive in accordance with the degree of current in the motor circuit for rendering said energizing circuit effective or ineffective to cause energization of said winding, and means for rendering the said current responsive means operatively sensitive to different degrees of current in the motor circuit depending upon the degree of displacement of the controller out of the certain position.

35. In a brake control system for a vehicle having one or more propulsion motors, the combination of means for establishing a dynamic braking circuit for the one or more motors, a resistor included in the dynamic braking circuit, a stepping relay operative to vary the amount of the resistor included in the circuit, said relay having a winding effective to cause continuing operation of the relay only in response to repeated alternate energization and deenergization thereof, an energizing circuit on which the said winding operates, means effective when said energizing circuit is conditioned to cause energization of the said operating winding for effecting repeated alternate energization and deenergization of the winding, and means responsive to the degree of current in the said dynamic braking circuit for rendering said energizing circuit effective or ineffective to cause energization of said winding.

36. In a motor control system, the combination of means for establishing a motor circuit, a resistor in the motor circuit, a stepping relay including a rotary armature effective upon rotative movement to vary the amount of said resistor included in the motor circuit, said relay having an operating winding effective only in response to repeated alternate energization and deenergization thereof to cause progressive step-by-step rotative movement of said armature in a given direction, an energizing circuit on which said operating winding operates, means effective while the said energizing circuit is conditioned to cause energization of the operating winding for automatically effecting repeated alternate energization and deenergization of said winding, and means operatively responsive in accordance with the degree of current in the motor circuit for conditioning the said energizing circuit alternatively to cause or to prevent energization of said operating winding.

CLAUDE M. HINES.